(12) United States Patent
von Burg

(10) Patent No.: US 11,926,092 B2
(45) Date of Patent: *Mar. 12, 2024

(54) ADDITIVE MANUFACTURING DEVICE WITH A HEATING DEVICE

(71) Applicant: SINTRATEC AG, Brugg (CH)

(72) Inventor: Christian von Burg, Niederteufen (CH)

(73) Assignee: SINTRATEC AG, Brugg (CH)

( * ) Notice: Subject to any disclaimer, the term of this patent is extended or adjusted under 35 U.S.C. 154(b) by 361 days.

This patent is subject to a terminal disclaimer.

(21) Appl. No.: 17/091,878

(22) Filed: Nov. 6, 2020

(65) Prior Publication Data

US 2021/0069791 A1 Mar. 11, 2021

Related U.S. Application Data

(63) Continuation of application No. 15/556,274, filed as application No. PCT/EP2016/063535 on Jun. 13, 2016, now Pat. No. 10,882,112.

(30) Foreign Application Priority Data

Jun. 17, 2015 (EP) ..................................... 15172624

(51) Int. Cl.
*B29C 64/153* (2017.01)
*B22F 10/00* (2021.01)
(Continued)

(52) U.S. Cl.
CPC ............ *B29C 64/153* (2017.08); *B22F 10/00* (2021.01); *B22F 10/28* (2021.01); *B22F 12/13* (2021.01);
(Continued)

(58) Field of Classification Search
CPC .......... B22F 10/00; B22F 10/28; B22F 12/60; B22F 12/13; B29C 64/295; B29C 64/153; B29C 64/268; B33Y 10/00; B33Y 30/00
See application file for complete search history.

(56) References Cited

U.S. PATENT DOCUMENTS 4,162,390 A 7/1979 Kelly
4,863,538 A 9/1989 Deckard
(Continued)

FOREIGN PATENT DOCUMENTS

DE 202004007214 U1 * 9/2004 ............ B01J 19/087
DE 102005024790 A1 12/2006
(Continued)

OTHER PUBLICATIONS

English Translation of DE 202004007214 U1, retrieved from espacenet on Nov. 7, 2022 (Year: 2022).*
(Continued)

*Primary Examiner* — Francisco W Tschen
*Assistant Examiner* — Elisa H Vera
(74) *Attorney, Agent, or Firm* — Hard IP LLC

(57) ABSTRACT

An additive manufacturing device for manufacturing a solid article comprises a laser generation unit, a raw material supply unit, a raw material container containing a raw material and having a raw material surface exposed to a laser beam to be emitted by the laser generation unit in operation and a control unit. The heating device includes a heating surface for heating the raw material surface to form a pre-heated raw material surface. The laser generation unit is disposed with a directing unit to direct the laser beam onto the pre-heated raw material surface according to a computer generated model of the solid article stored in a storage unit associated with the control unit. The laser beam generated by the laser generation unit passes through the heating surface onto the pre-heated raw material surface.

20 Claims, 8 Drawing Sheets

(51) Int. Cl.

| | | |
|---|---|---|
| *B22F 10/28* | (2021.01) | |
| *B22F 10/34* | (2021.01) | |
| *B22F 10/36* | (2021.01) | |
| *B22F 10/73* | (2021.01) | |
| *B22F 12/13* | (2021.01) | |
| *B22F 12/41* | (2021.01) | |
| *B22F 12/60* | (2021.01) | |
| *B22F 12/90* | (2021.01) | |
| *B29C 64/255* | (2017.01) | |
| *B29C 64/268* | (2017.01) | |
| *B29C 64/295* | (2017.01) | |
| *B33Y 10/00* | (2015.01) | |
| *B33Y 30/00* | (2015.01) | |

(52) U.S. Cl.
CPC ............ *B22F 12/60* (2021.01); *B29C 64/255* (2017.08); *B29C 64/268* (2017.08); *B29C 64/295* (2017.08); *B33Y 10/00* (2014.12); *B33Y 30/00* (2014.12); *B22F 10/34* (2021.01); *B22F 10/36* (2021.01); *B22F 10/73* (2021.01); *B22F 12/41* (2021.01); *B22F 12/90* (2021.01); *Y02P 10/25* (2015.11)

(56) References Cited

U.S. PATENT DOCUMENTS

| | | | |
|---|---|---|---|
| 5,545,367 A | 8/1996 | Bae et al. | |
| 5,786,023 A | 7/1998 | Maxwell et al. | |
| 5,908,569 A | 6/1999 | Wilkening et al. | |
| 10,882,112 B2 * | 1/2021 | von Burg | B33Y 30/00 |
| 2006/0118532 A1 | 6/2006 | Chung et al. | |
| 2010/0155985 A1 | 6/2010 | McAlea et al. | |
| 2014/0264187 A1 | 9/2014 | Lake et al. | |
| 2014/0265034 A1 * | 9/2014 | Dudley | B29C 64/124 264/401 |
| 2015/0261196 A1 * | 9/2015 | Wilson | B33Y 50/02 700/119 |
| 2018/0043614 A1 | 2/2018 | Greenfield et al. | |

FOREIGN PATENT DOCUMENTS

| | | |
|---|---|---|
| EP | 1600282 A1 | 11/2005 |
| EP | 2839948 A1 | 2/2015 |
| WO | 9208566 A1 | 5/1992 |
| WO | 2006105827 A1 | 10/2006 |

OTHER PUBLICATIONS

Helios Quartz, Quartz Properties, Helios Quartz, Jul. 23, 2017, pp. 1-2, retrieved from URL: https://www.heliosquartz.com/prodotti/proprieta-del-quarzo/?lang=en.

Niino et al., "Effect of Powder Compaction in Plastic Laser Sintering Fabrication", 2009, pp. 193-205.

Markevicius et al., "Conductive Transparent Film Heater as Alternative to Heating Table: Towards New Intelligent Mobile Accurate Thermo-Electrical (IMAT) Device for Structural Conservation of Paintings," May 2011, 8 pgs.

Zhang et al., Gas Lasers: CO2 lasers—progressing from a varied past to an application-specific future, Nov. 4, 2016, LaserFocusWorld, p. 1.

Foreal Spectrum, Care and Cleaning of Optics, Aug. 29, 2013, p. 1.

Iain MacMillan et al., Improving laser optics coatings, 2013, Photonik international, pp. 1-2.

International Search Report & Written Opinion received in PCT/EP16/63535 dated Sep. 8, 2016, 11 pgs.

* cited by examiner

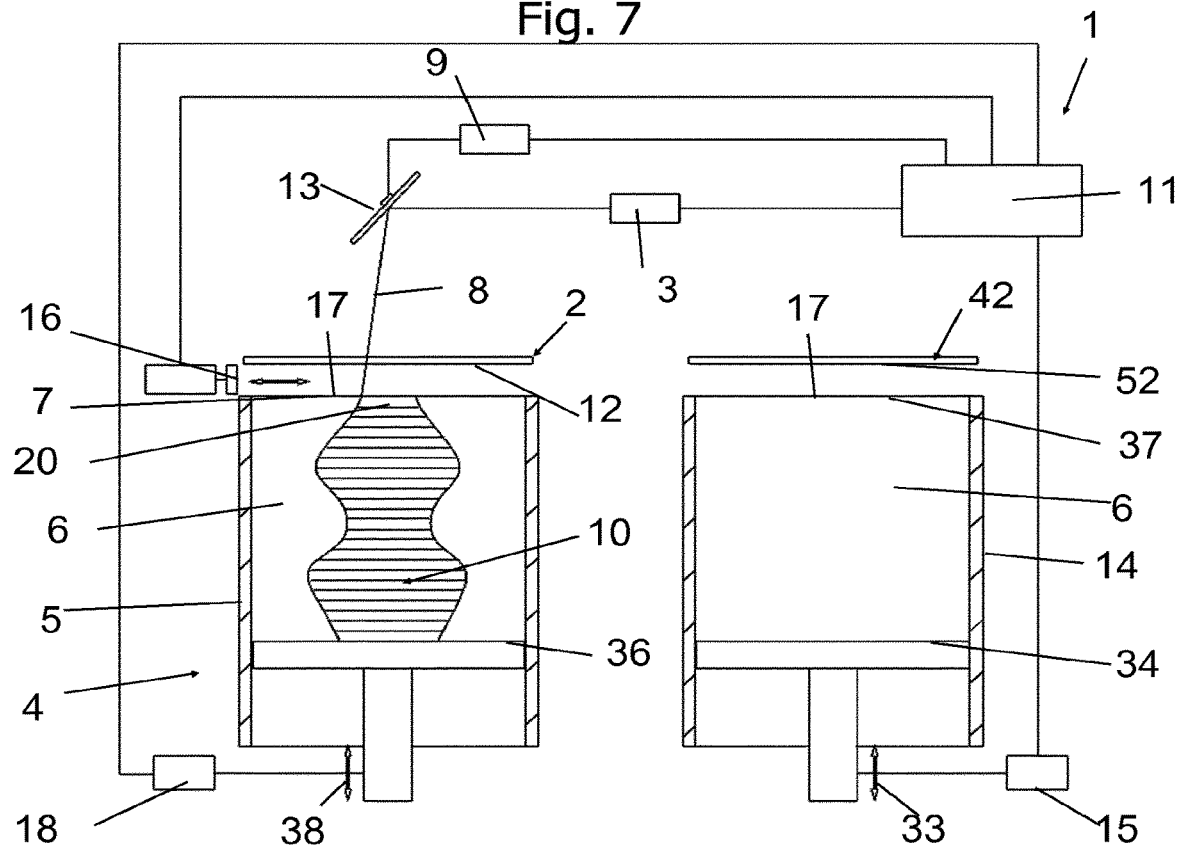
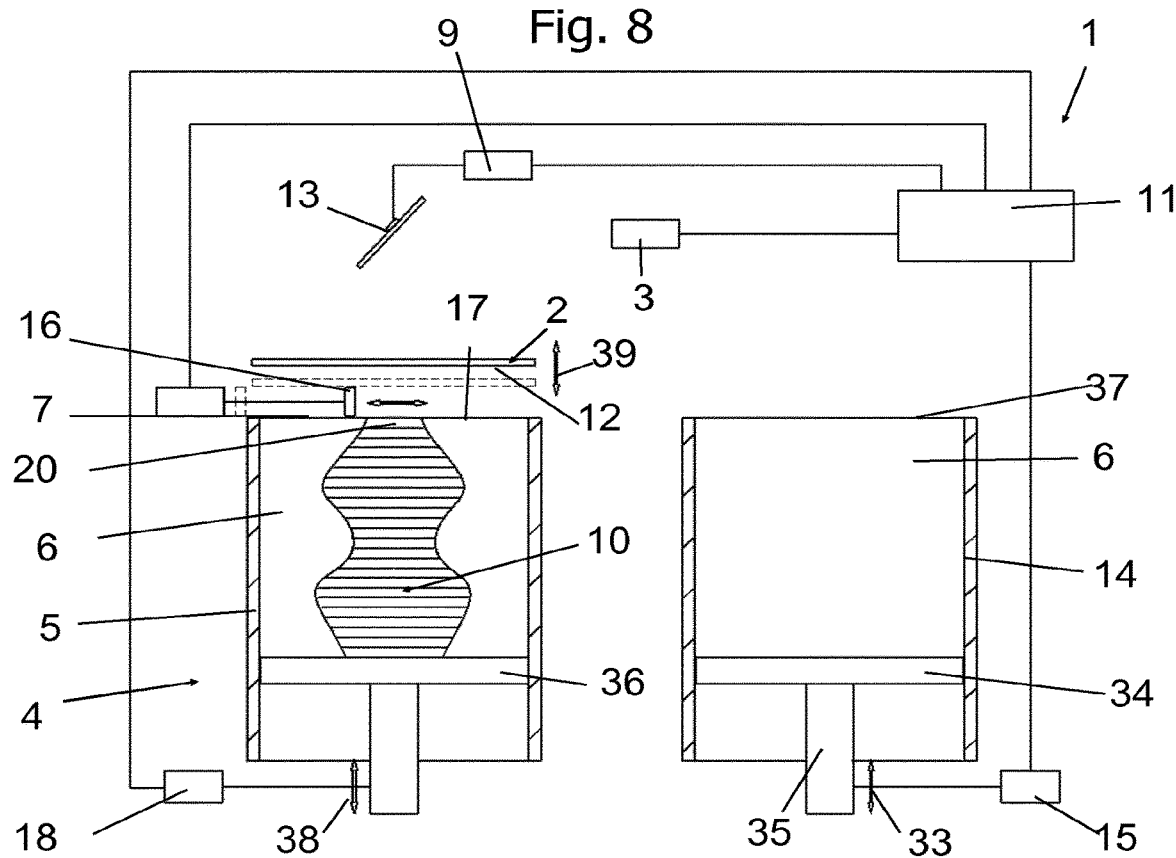

ADDITIVE MANUFACTURING DEVICE WITH A HEATING DEVICE

CROSS-REFERENCE TO RELATED APPLICATIONS

This application is a continuation application of U.S. patent application Ser. No. 15/556,274 which is a national phase application under 35 U.S.C. 371 of international patent application no. PCT/EP16/63535, filed on Jun. 13, 2016 which claims priority to European patent application no. EP15172624.7, filed on Jun. 17, 2015, the contents of all of which are incorporated herein by reference in their entirety.

TECHNICAL FIELD

The invention relates to an additive manufacturing device comprising a heating device and a method for operating an additive manufacturing device. Such an additive manufacturing device can be configured as a selective sintering device for manufacturing three-dimensional solid articles.

DESCRIPTION OF RELATED ART

A selective sintering device, as for instance laid out in U.S. Pat. No. 4,863,538 A includes a laser or other directed energy source, which is selectable for emitting a beam in a target area for producing a solid article from a powder as a raw material. The powder is dispensed into the target area in a layer-wise manner. The laser beam applied onto the powder in the target area selectively sinters the powder to produce a sintered layer. The layers are joined together in a stepwise manner until the complete part is formed. The part is embedded in the powder until it is taken out from the powder container and separated from the powder. The powder can be one of a plastic, metal, ceramic powder or a composite material. A control mechanism operates to move the aim of the laser beam and modulates the laser to selectively sinter the layer of powder dispensed into the target area searched at only of the powder disposed within defined boundaries is sintered to produce the desired layer of the part. The control mechanism operates the laser to selectively sinter sequential layers of powder, producing a completed part comprising a plurality of layers sintered together. The boundaries correspond to the cross-section of the part in the respective layer. The boundaries can be defined by a computer-generated model obtained from a CAD (computer-aided design) or CAM (computer-aided manufacturing) software.

A heating device can be used in the additive manufacturing device for heating the powder when performing a selective laser sintering method with the device of U.S. 4,863,538 A. By sintering it is intended any process by which a bulk of loose particles, such as a powder is transformed by the application of thermal energy into a solid body. A laser sintering method is therefore an additive manufacturing technique using a laser as a power source to sinter a powder.

A laser sintering method for manufacturing a free-form solid article has been disclosed for example in WO9208566A1. Such a laser sintering method, if applied in an additive manner, thus manufacturing the free-form solid article layer-by-layer.

The thermal energy required for transforming the powder layer-by-layer into a solid body is supplied by a laser. The laser beam is directed onto the powder surface and selectively solidifies the points on this surface according to a pre-described shape, which is usually generated by the design of a 3D model of the solid body. The 3D model is composed of an infinite number of surface points or pixels. By defining a sectional plane corresponding to the working layer of the additive manufacturing device, a section curve or a section plane is generated. If the 3D model is a computer-generated shape, the section curve or section plane is a computer generated spline or planar object. This planar object is defined by a plurality of coordinate pairs. In case of use of a Cartesian coordinate system, the spline or planar object is defined by a plurality of coordinate pairs defining the location of the section curve or section plane in the x, y direction. The z direction is constant for a section curve and corresponds to the position of the layer in the printer. The z coordinate increases with every layer completed. Thus, the solid body is completely manufactured if its height, thus the largest value of the z-coordinate of the 3D model is reached.

The transformation of the powder into a solid body involves an at least partial local melting process of the particles by the thermal energy of the laser beam. By melting at least the surface of the particles in the layer exposed to the laser beam, neighboring particles create a bond which solidifies as soon as the supply of thermal energy stops, that is when the laser beam is directed to another spot on the layer. If the uppermost powder layer is pre-heated before the laser beam is directed onto specific surface spots to melt selective portions of the uppermost layer to thereby generate a layer of the solid article, thermal stress and required laser power can be reduced. According to WO9208566A1, a ring-shaped radiant heater is provided for pre-heating the powder surface.

However, the thermal energy provided by the laser leads to stress phenomena. The manufacture of the solid article by laser sintering therefore results in curling and warpage of the solid layers as described in WO9208566A1. These warpage and curling effects are attributed to shrinkage effects as well as to uneven cooling. Uneven cooling may also lead to unexpected growth of the sintered portion of the layer. Such unexpected growth may result in some dimensions of the solid article to be out of the tolerances originally foreseen and thus increasing waste.

For this reason, it has been contemplated in WO9208566A1 to improve the distribution of thermal energy on the surface of the powder as well as to pre-heat the layer to reduce thermal stress. A ring-shaped heating element has been proposed rather than a plurality of plate-shaped heating surfaces, which do not correspond to the circular cross-section of the powder cylinder used for generation of the solid article. The arrangement foresees in particular a frusto-conical heating element with a central opening for unhindered passage of the laser beam.

An example of a further prior art heating device for an additive manufacturing device is shown in the document DE 10 2005 024 790 A1. This document shows a radiant heater composed of a material having low thermal inertia by using a material of a thermal diffusivity of more than $1.5*10^{-4}$ $m^2/s$ at a temperature of 20° C., in particular a graphite foil. A central opening is provided for allowing the laser beam to pass through the heating device onto the surface of a powder to be sintered for a multilayer sintering process. The problem of maintaining an accurate temperature of the material for ensuring good quality of the three dimensional object has been recognized and solved by a heating element which allows for a fast and exact adjustment and control of the temperature, however a yet unresolved problem constitutes the provision of a uniform temperature distribution over the powder surface. It has also been shown in document EP 2839948 A1 that a functional opening for a laser beam can be foreseen in the heating element as well as a functional opening for material supply and also for an additional IR radiation source. This means that the heating element can not provide a uniform supply of heat over the entire powder surface. Therefore, an uneven temperature distribution still results at least in the portion of the heating element, which is configured as an opening for the material supply. This opening can not be closed as new powder material has to be supplied for each layer. Furthermore, the opening for the laser beam as well as for the IR heating element are not configured as a heating element. The heating modules of the heating element are configured as independently controllable heating modules arranged between or adjacent to the functional openings. For this reason the entire powder surface doesn't reach a uniform temperature even if a heating element as configured according to EP 2839948 A1 is used. For this reason, a reliable product quality could not yet be achieved by any of the prior art heating devices.

BRIEF SUMMARY OF THE INVENTION

It is thus an object of the invention to provide a device and a method for improving the product quality of a solid article manufactured by an additive manufacturing method. In particular, it is an object of the invention to provide a device and methods for obtaining a solid article with predictable physical characteristics.

The problem to be solved by the invention is thus to provide a more uniform temperature distribution over the entire powder surface of the uppermost powder layer. The use of conventional radiant heaters results in temperature differences on the powder surface, which can deviate up to about 15 degrees Celsius from the target temperature.

An additive manufacturing device for manufacturing a solid article comprises a laser generation unit, in particular a diode laser generation unit, a raw material supply unit, a raw material container containing a raw material and having a raw material surface exposed to a laser beam to be emitted by the laser generation unit in operation, a control unit and a heating device for heating the raw material surface to form a pre-heated raw material surface. The laser generation unit is disposed with a directing unit to direct a laser onto the pre-heated raw material surface according to a computer-generated model of the solid article stored in a storage unit associated with the control unit. The laser beam generated by the laser generation unit passes through the heating surface onto the pre-heated raw material surface. For the laser beam to be transmitted through the heating surface of the heating device, at least a portion of the heating surface has a transmittance for the laser beam. In other words at least a portion of the heating surface is transmissive for the laser beam. Thus the heating device continuously extends over the raw material surface exposed to the laser beam.

Advantageously the wavelength can be in the range from ultraviolet light to far infra-red light, thus from about 100 nm up to and including 1 mm of wavelength. Ultraviolet light thereby lies in a range of less than 100 nm up to and including about 380 nm of wavelength. Far infra-red light thereby lies in a range of about 30 μm up to and including about 1 mm of wavelength.

According to a preferred embodiment the wavelength can be in the range from visible light to mid-infra-red light, thus from about 400 nm up to and including 30 μm of wavelength. Visible light thereby lies in a range of less than 400 nm up to and including about 750 nm of wavelength. Mid-infra-red light thereby lies in a range of more than 3 μm up to and including about 30 μm of wavelength. In this range, a $CO_2$ laser can advantageously employed.

According to a preferred embodiment the wavelength can be in the range from visible light to near-infra-red light, thus from less than about 400 nm up to and including 3 μm of wavelength. Visible light thereby lies in a range of less than 400 nm up to and including about 750 nm of wavelength. Near-infra-red light thereby lies in a range of more than 750 nm up to and including about 3 μm of wavelength.

According to a particularly preferred embodiment the wavelength can be in the range of near-infra-red light, thus from 750 nm up to and including 3 μm of wavelength.

According to a particularly preferred embodiment the wavelength can be in the range of visible light, thus from less than about 400 nm up to and including 750 nm of wavelength.

According to an embodiment, the heating surface is transparent for a laser beam in particular of a diode laser. In particular, the heating surface is transparent for light of a wavelength in the range of 300 nm up to and including 1100 nm, preferably of a wavelength in the rage of 400 up to and including 950 nm, particularly in a preferred range of 445 nm up to and including 808 nm. An advantage to use a laser in the visible spectrum is that it makes optical adjustments during the additive manufacturing process safer. Conveniently a diode laser can be used, which can comprise a semiconductor based on any one of the following base compounds: AlN, GaN, SiC, InN, BeSe, ZnS, MgS, MgSe, BeTe, ZnSe, AlP, GaP, AlAs, ZnTe, CdSe, GaAs, InP, Si, Ge or combinations of these materials, such as InGaAlP, GaAlAs, InGaAs, InGaAsP. In particular, a blue laser can be used. The power of the laser can be conveniently in a range of 0.1 W up to 100 W. Advantageously, a laser operating in the blue range of the spectrum is used. According to a particularly preferred example, one or more blue lasers of 2.3 W are used. Alternatively, a $CO_2$ laser can be used, whereby the base compound of a $CO_2$ laser is carbon dioxide.

According to an embodiment, the heating device is configured as a solid body, in particular as a plate element, which has a length and a width and a height, whereby the height of the heating device is smaller than the length or the width, whereby the length of the heating device corresponds at least to the length of the raw material container and the width of the heating device corresponds at least to the width of the raw material container. The length and the width of the heating device can be the same, in particular if the heating device has a quadratic cross-section or a circular cross-section in which the length and the width correspond to the diameter of the heating device. In particular, the heating device can form a cover or lid of the raw material container, whereby the raw material is enclosed in a closed space formed by the bottom and walls of the raw material container on one hand and by the heating device on the other hand. The heating surface can be in contact with the surface of the raw material. According to an embodiment, the material container can be configured as a heated material container.

According to an embodiment, the heating device can contain a heating element. The heating element can extend essentially along the circumference of the heating surface. According to a further embodiment, the heating device can contain a plurality of heating elements for heating a plurality of heating surfaces. In particular, a plurality of heating surfaces can be provided on the circumference of a centrally arranged heating surface, which has a transmittance to the laser beam. According to an embodiment, the heating surface can be heated by the heating element.

According to an embodiment, the heating surface can comprise a sensor element, in particular a temperature sensor element or can be a sensor element.

According to an embodiment, the distance between the heating surface and the pre-heated raw material surface can be less than 200 mm. The distance should be sufficient to accommodate a raw material distribution unit for distributing the raw material from the raw material supply container to the raw material container for generating a new layer of raw material. The raw material distribution unit can comprise one of a doctor blade, a forward rotating roller or a counter-rotating roller. The raw material can be distributed by spreading the raw material over the raw material surface of the previous layer after completion of the previous solid layer portion of the solid article.

According to an embodiment, the distance between the heating surface and the pre-heated raw material surface is less than 10 mm. Thereby the air gap between the heating surface and the raw material surface is minimized. The heating device or the raw material container can be movable to allow the raw material distribution unit to pass between the heating surface and the pre-heated raw material surface, in particular in a direction normal to the raw material surface such that when the solid article is formed by a succession of layers, the distance between the heating surface and the pre-heated raw material surface remains substantially constant. In particular, the temperature of each of the heating surfaces may vary based on temperature gradients present in the pre-heated raw material. In particular, the temperature of the heating surfaces may be higher than the temperature of the pre-heated raw material surface. Thereby the heat sink effect of the wall of the raw material container can be compensated for. By providing an independent temperature control for any of the heating surfaces, the temperature of the pre-heated raw material surface can be kept substantially constant. In particular, the variation of the temperature over the pre-heated raw material surface can be less than 4 degrees Celsius, more preferably less than 2 degrees Celsius, most preferred less than 1 degrees Celsius.

In particular, the boundary regions of the raw material, i.e. the raw material close to the wall of the raw material container tend to be colder than the core regions and the previously sintered regions tend to be hotter. For this reason, a multi-zone heating device according to the configuration as set out in the previously described embodiment can be particularly of advantage as any zone can contain individual sensors and individually controlled heating elements.

For these reasons, the distance between the heating surface and the pre-heated raw material surface in some preferred embodiments is less than 200 mm, advantageously less than 100 mm, and particularly preferred less than 10 mm. Thereby the thermal energy can be transferred substantially without losses from the heating surface to the pre-heated raw material surface.

According to an embodiment, the heating surface comprises a nonstick coating, such as a polytetrafluorethylene (PTFE). The raw material surface can be in contact with the heating surface. Thereby heat is transmitted by conduction and losses due to convective heat transfer are essentially eliminated if such a configuration is used in an embodiment.

The heating surface can contain at least one the elements of the group of a transparent conductive oxide (TCO), a network of nanowires, of nanotubes or a glass material. According to an embodiment, the heating surface contains a transparent conductive oxide, such as for example indium tin oxide at least for a segment which requires a substantial transmittance for the laser. Alternatively or in addition thereto the heating surface can contain a network of nanowires. The structure of nanowires can in particular include thermally and/or electrically conducting materials, such as metals. In particular, a structure containing Ag, Au nanowires can be used. These nanowires can be embedded in a resin so to enhance thermal conductivity of such a resin. According to another variant, an intelligent mobile accurate thermo-electrical device, also known as IMAT can be used as a heating surface. Such an IMAT heating surface comprises a conductive transparent heater. A material employed for such an IMAT heating surface can be carbon nanotube. A thin, lightweight, transparent heating surface can be obtained. The surface may be stretchable or flexible, thus may be adaptive to variable geometrical dimensions of the solid article and the raw material container to be used. Conductive films made with carbon nanotubes and metal nanowires, in addition to their low sheet resistance, possess an optical transmittance in the visible spectrum and can form electrically conductive, yet almost completely transparent films, measuring only about 50-100 nanometers thick. The conductive film can be placed on a glass or plastics substrate, such as a PET or polycarbonate substrate.

According to an embodiment, the heating surface can include a glass material, in particular one of the group of magnesium fluoride ($MgF_2$), a sapphire, a calcium fluoride ($CaF_2$), barium fluoride ($BaF_2$), zinc selenide (ZnSe), silicon (Si), a silicon dioxide (silica, $SiO_2$), a borosilicate, germanium (Ge), iridium (Ir) potassium bromide (KBr), sodium chloride (NaCl) or zinc sulfide glass. The glass material can also comprise combinations of these materials, in particular, the glass can be composed of a plurality of layers of different composition, wherein at least one of the layers contains one of the group of compounds named in the previous sentence.

In particular, any of the above glass materials may be used for obtaining a high transmittance for a $CO_2$ laser through the heating surface. Under transmittance, it is to be understood the percentage of laser light passing through the heating surface. A transmittance of 80% or more means that at least 80% of the laser is transmitted through the heating surface. A transmittance of 90% means that at least 90% of the laser is transmitted through the heating surface. A transmittance of 95% means that at least 95% of the laser is transmitted through the heating surface. The laser can be in particular a $CO_2$ laser or a diode laser comprising any of the base compounds mentioned earlier.

According to an embodiment, the heating surface can comprise a conductive film, e.g. a conducting film containing any of the materials of the group of a transparent conductive oxide (TCO), a network of nanowires, nanotubes or of a glass material. The conductive film can also be placed on an elastic polymer to provide a configuration of an adjustable heating surface. According to a further embodiment, a multifilament yarn containing carbon nanotubes can be woven to form a textile or fabric heating surface. In particular the heating surface can be configured according to the publication CONDUCTIVE TRANSPARENT FILM HEATER AS ALTERNATIVE TO HEATING TABLE: TOWARDS NEW INTELLIGENT MOBILE ACCURATE THERMO-ELECTRICAL (IMAT) DEVICE FOR STRUCTURAL CONSERVATION OF PAINTINGS by Tomas Markevicius et al, published under http://www.imatproject.eu/en/pId/conductive-transparent-film-heater-as-alternative-to-heating-table-towards-new-intelligent-mobile-accurate-thermo-electrical-imat-device-for-structural-conservation-of-paintings/23.

According to an embodiment, the heating device comprises an upper surface extending substantially opposite to the heating surface. The upper surface can comprise an anti-reflective coating, such that the laser beam can pass the heating device without being reflected by the upper surface.

According to an embodiment, the heating device comprises an upper and lower surface whereby the heating surface is sandwiched between the upper and the lower surface. The upper and lower surfaces can comprise an anti-reflective coating or layer, such that the laser beam can pass the heating device without being reflected by the upper and lower surfaces.

According to an embodiment, a heating device can be provided which comprises a heating surface and heated surface. The heated surface can be heated by the heating surface. The heated surface can be foreseen between the heating surface and the pre-heated raw material surface. The heated surface receives thermal energy from the heating surface, whereby the temperature of the heated surface increases. In other words, the heated surface is passively heated. The heated surface can be in contact with the raw material surface and transmits the thermal energy received from the heating surface to the raw material surface to form a pre-heated raw material surface which is suitable for generating a layer of a solid article by application of a laser beam onto a selected portion of the pre-heated raw material surface. The heated surface may or may not be transmissive to laser light. If not, it is placed outside the laser path.

According to an embodiment, a compression force can be applied onto the raw material by pressing the raw material surface against a pressurizing device. In other words, the raw material is compressible by a pressurizing device. The pressurizing device can be arranged in the raw material supply unit and/or in the heating device. In particular, the pressurizing device can comprise the heating surface. In case a pressure is to be applied onto the raw material by the pressurizing device, the heating surface is pressed upon the surface of the raw material to generate a pre-compressed pre-heated raw material surface. The pressurizing device can include at least one of the heating surface or the heating device.

The raw material has been compressed also in the prior art to improve the mechanical properties of a solid article manufactured by an additive manufacturing method. In particular, an aim is to reduce porosity of a powder raw material. According to a prior art solution, as disclosed in the publication "Effect of Powder Compaction in Plastic Laser Sintering Fabrication" by Niino, Toshiki et al. in 2009 published under http://sffsymposium.engr.utexas.edu/Manuscripts/2009/2009-18-Niino.pdf the powder is compressed by a rotating roller which is used to apply a new powder layer. However, a disadvantage reported with prior art compression of raw material are defects in the surface of the powder layer. The compression of the prior art raw material is performed before the laser sintering. Thus, a powder with resilient properties is likely to expand at least to some extent once the pressure from the roller is removed. Due to the difficulty in predicting the extent of the expansion of the powder, it can be difficult to predict the mechanical properties of the solid article. By a pressurizing device as disclosed above such prior art disadvantages may surprisingly be removed, due to the fact, that a pressure can be applied uniformly over the pre-heated raw material surface to form a pre-heated pre-compressed raw material surface.

According to an embodiment, the raw material comprises a powder. The powder can contain a polymer, in particular a polyamide with a surface melting temperature greater than 170 degrees Celsius at ambient pressure conditions, which undergoes a sintering process upon exposure to the laser beam. The powder can contain one compound of the group of a polycarbonate (PC), a polymethylmethacrylate (PMMA), a polystyrene (PS), a high density polyethylene (PE-HD), a polyamide (PA) or a polyaryletherketone (PEEK). In particular, the powder can contain one of the compounds of the group of a PA11 or PA12 or PEEK. The powder can contain pigments or other additives in particular for enhancing light absorption. The powder can in particular contain carbon black. Furthermore, the powder can contain a metal, e.g. aluminum.

Furthermore, the objective problem of the invention is solved by a method for operating an additive manufacturing device for manufacturing a solid article by an additive manufacturing method. For performing the method an additive manufacturing device is used, which comprises a laser generation unit, a raw material supply unit, a raw material container containing a raw material and having a raw material surface forming a first layer which can be exposed to a laser beam emitted by the laser generation unit, a control unit and a heating device for heating the raw material surface. The heating device includes a heating surface for heating the surface of the raw material in the raw material container. According to an embodiment, the material container can be configured as a heated material container. In a first step, the raw material is pre-heated by the thermal energy generated by the heating surface to from a pre-heated raw material surface. In a second step, a laser beam is generated by the laser generation unit. In a third step a directing unit directs the laser beam emitted by the laser generation unit onto the pre-heated raw material surface. The laser beam is directed over the pre-heated raw material surface according to a computer-generated model of the solid article stored in a storage unit associated with the control unit. The laser beam is directed through the heating surface onto the pre-heated raw material surface such that a first solid layer portion of the solid article is obtained when directing the laser beam onto the pre-heated raw material surface. In at least one subsequent step, a second layer of the raw material is supplied from the raw material supply unit and deposited on top of the first layer. In at least one optional further subsequent step, the operations performed in the previous steps are repeated, until the solid article is obtained.

By directing the laser beam onto the pre-heated raw material surface the raw material can be sintered or melted in at least in a region covered by a spot of the pre-heated raw material surface exposed to the laser beam. The melted or sintered region is subsequently solidified, whereby subsequently means after termination of the exposure of the region to the laser beam.

The laser beam can be exposed for a period of less than a millisecond at a spot and subsequently directed to an adjacent spot for sintering or melting the pre-heated raw material surface at the adjacent spot. In particular, the laser beam proceeds at a speed of at least 50 mm/s, in particular at least 100 mm/s, preferably at least 180 mm/s, particularly preferred at least 1000 mm/s over the pre-heated raw material surface. In particular, the temperature at the spot is at least 0.5° C. above the temperature of the pre-heated raw material surface.

According to an embodiment, the raw material contains a powder. By directing the laser beam onto the pre-heated raw material surface the raw material can be sintered or melted at least in a region covered by the spot of the pre-heated raw material surface exposed to the laser beam.

According to another embodiment, the raw material can be liquid or a slurry. By directing the laser beam onto the pre-heated raw material surface the raw material can be solidified at least in a region covered by the spot of the pre-heated raw material surface exposed to the laser beam. In particular, a chemical reaction can be initiated by exposing the pre-heated raw material to the laser beam.

According to an embodiment, the laser beam is exposed for a period of less than a second at a spot and subsequently directed to an adjacent spot for sintering or solidifying the pre-heated raw material surface at the adjacent spot.

Advantageously, the temperature at the spot is at least 0.5° C. above the temperature of the pre-heated raw material surface. Thereby a solidification, a melting or a sintering process can take place, which at least partially creates a bond between adjacent particles to form a solid surface to generate a solid article within the raw material.

The heating device according to any of the embodiments is thus suitable for an additive manufacturing application, in particular of a selective laser sintering application. Advantageously the temperature of the raw material surface, in particular the powder bed serving as a source for modelling the solid article can be kept substantially uniform over the entire surface of the raw material surface. The additive manufacturing device according to any of the embodiments thus works with a precise raw material surface temperature having a temperature variation with respect to the target temperature of not more than +/−3 degrees Celsius, preferably not more than +/−2 degrees Celsius, particularly preferred not more than +/−1 degrees Celsius.

Thereby, the quality of the solid article can be improved in an unexpected and thus surprising manner and the characteristics of the solid article become more predictable. Consequently, it is possible to dispense with the individual tests which are currently required for each manufactured solid article to ensure that the solid article meets the required specifications if manufactured according to any of the prior art methods currently available.

BRIEF DESCRIPTION OF THE DRAWINGS

The invention will be explained in more detail in the following with reference to the drawings. There are shown in a schematic representation in.

DETAILED DESCRIPTION

Figure 1:
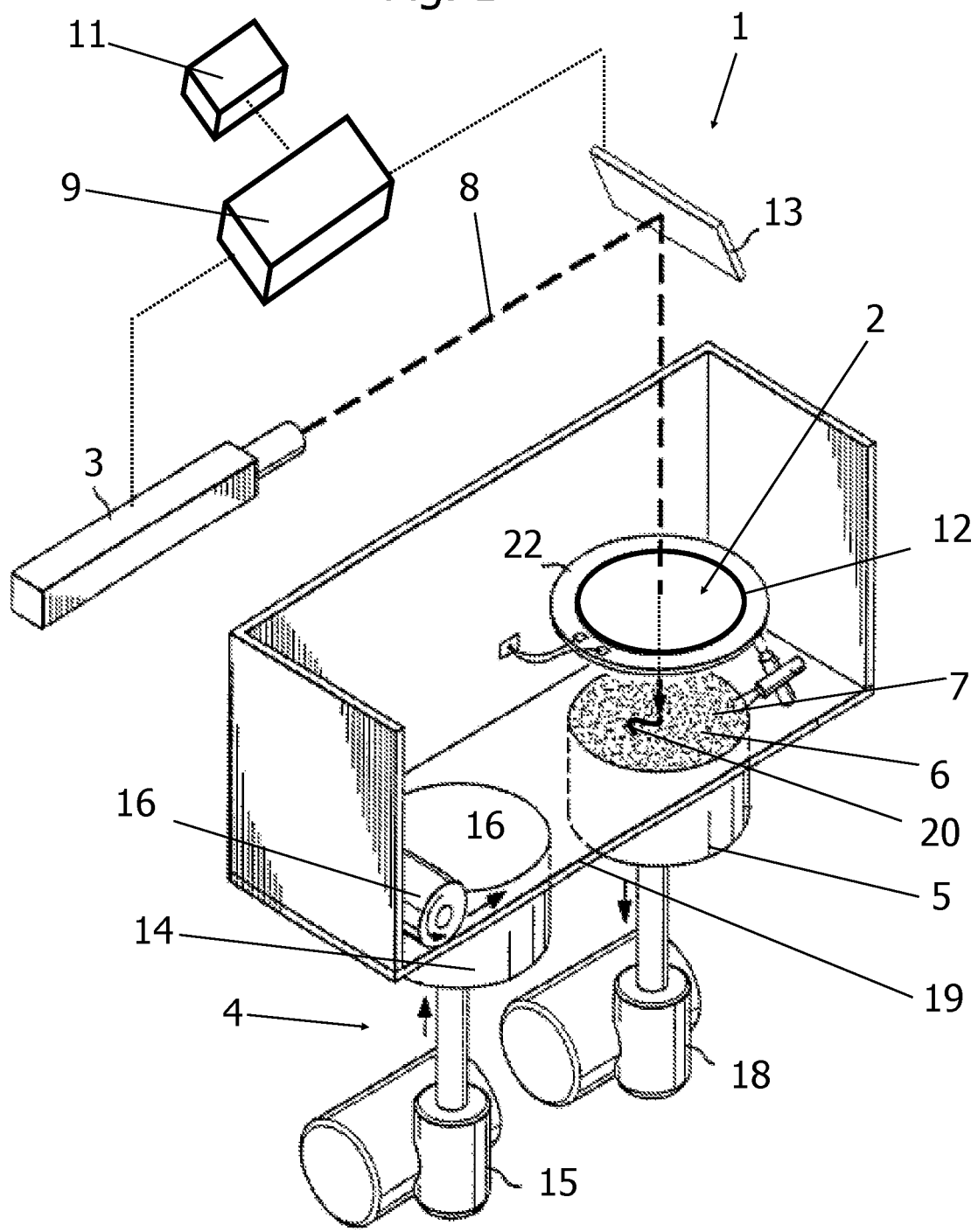
FIG. 1 a perspective view of an additive manufacturing device including a heating device according to a first embodiment of the invention, FIG. 2 a view on the assembly of a heating device and a raw material container according to a second embodiment of the invention, FIG. 3 a view on the heating device according to a third embodiment of the invention, FIG. 4 a front view of the heating device of FIG. 3, FIG. 5 a schematic view of an additive manufacturing device according to a fourth embodiment of the invention, FIG. 6 a schematic view of an additive manufacturing device according to a fifth embodiment of the invention, FIG. 7 a schematic view of an additive manufacturing device according to a sixth embodiment of the invention, FIG. 8 a schematic view of an additive manufacturing device according to a seventh embodiment of the invention, FIG. 9a a schematic view of an additive manufacturing device according to an eighth embodiment showing a first step of a method for generating a new layer, FIG. 9b a schematic view of an additive manufacturing device according to the eighth embodiment showing a second step of the method, FIG. 9c a schematic view of an additive manufacturing device according to the eighth embodiment showing a third step of the method, FIG. 9d a schematic view of an additive manufacturing device according to the eighth embodiment showing a fourth step of the method, FIG. 9e a schematic view of an additive manufacturing device according to the eighth embodiment showing a fifth step of the method, FIG. 9f a schematic view of an additive manufacturing device according to the eighth embodiment showing a sixth step of the method, FIG. 9g a schematic view of an additive manufacturing device according to the eighth embodiment showing a seventh step of the method.

FIG. 1 shows a perspective view of a portion of an additive manufacturing device 1 including a heating device 2 for the additive manufacturing device for manufacturing a solid article 10 in an additive manufacturing sequence. The additive manufacturing device comprises a laser generation unit 3, in particular a diode laser generation unit, a raw material supply unit 4 and a raw material container 5 containing a raw material 6. The raw material 6 has a raw material surface 7 exposed to a laser beam 8 to be emitted by the laser generation unit 3 when it is operated. The operation of the laser is controlled by a control unit 9. The heating device 2 includes a heating surface 12 to provide thermal energy to the raw material surface 7 to form a pre-heated raw material surface 17. The laser generation unit 3 is disposed with a directing unit 13 to direct the laser beam 8 onto the pre-heated raw material surface 17 according to a computer generated model of the solid article 10 stored in a storage unit 11 associated with the control unit 9. Thereby the operation of the directing unit 13 is controlled by the control unit 9. The laser beam 8 generated by the laser generation unit 3 passes through the heating surface 2 onto the pre-heated raw material surface 17. Thus, the laser beam 8 goes through the heating surface 12 of the heating device 2. In particular, the heating surface 12 is transparent for a laser beam of a diode laser. Advantageously the heating surface is transparent for light of a wavelength in a range of 100 nm up to and including 1 mm.

The generation of a solid article 10 by an additive manufacturing method performed by the additive manufacturing device involves the following steps. A raw material is supplied as a layer of a thickness of less than 1 mm by the raw material supply unit 4. According to a preferred embodiment, the thickness or height of the layer was about 100 µm. The raw material supply unit 4 can include a raw material supply container 14, which is filled with raw material. The raw material supply container 14 is movable in a direction normal to the plane containing the layer of raw material for manufacture of the solid article by the additive printing method. The raw material supply unit 4 includes a drive unit 15 for moving the bottom of the raw material supply container 14 in a stepwise manner. For the generation of each new layer, the bottom of the raw material supply container 14 is moved a step upwards such that a volume corresponding to the thickness of a new layer is supplied to the raw material chamber 20 connecting the raw material supply container 14 and the raw material container 5. The raw material chamber 20 is shown in FIG. 1 in a partially opened state, thus the front wall and the covering wall thereof have been omitted in the drawing to shown the elements of the raw material handling units comprising the raw material supply unit 4 and the raw material container 5. Once the bottom of the raw material supply container 14 is moved a step upward, the raw material for a second layer is provided. The raw material is distributed on the surface of the first layer for which the additive manufacturing process has already been completed. A raw material distribution unit 16 is provided for distributing the raw material in the raw material chamber 19. The raw material distribution unit 16 can be in particular be configured as a roller. The raw material distribution unit 16 can perform a sliding or rolling movement along the chamber bottom of the raw material chamber 19. The raw material distribution unit 16 thereby pushes the volume of raw material supplied for generation of the second layer to the raw material container 5. The raw material container 5 is also movable in a direction normal to the chamber bottom of the raw material chamber 19. In particular, a drive unit 18 can be foreseen for allowing the raw material container to move away from the bottom of the raw material chamber 19, which is in this drawing corresponding to a downward movement.

The heating device 2 includes a heating surface 12 for heating the surface 7 of the raw material 6 in the raw material container 5. The heating surface 12 is not visible in FIG. 1 as it extends towards the surface 7 of the raw material 6. The raw material 5 is pre-heated by the thermal energy generated by the heating surface 12 to from a pre-heated raw material surface 17. The heating device according to this embodiment is of a circular cross-section corresponding to the cross-section of the cylindrical raw material container. The heating device contains in this embodiment an annular heating surface 22 and the heating surface 12. The heating surface 12 is transparent to the laser beam, thereby the laser beam passes through the heating surface 12. The annular heating surface 22 can contain a radiation heater or a resistance heater. The laser beam 8 generated and emitted by the laser generation unit 3 is directed by a directing unit 13 onto the pre-heated raw material surface.

The laser can proceed at a speed of at least 50 mm/s. That means, the laser travels at a speed of at least 50 mm/s over the pre-heated raw material surface and sinters the raw material surface at the spots of contact.

The laser beam is directed over the pre-heated raw material surface 17 according to a computer generated model of the solid article 10 stored in a storage unit 11 associated with the control unit 9. The laser beam 8 travels through the heating surface 12 onto the pre-heated raw material surface 17 such that a first solid layer 20 of the solid article 10 is obtained when directing the laser beam 8 onto the pre-heated raw material surface 17. In at least one subsequent step, a second layer of the raw material is supplied from the raw material supply unit and deposited on top of the first layer. This subsequent step can be repeated until the solid article is obtained by adding the solid layers 20 one upon each other. The raw material container 5 is successively moved downwardly by the drive unit 18. After completion of the last solid layer, the printing process of the solid article is completed. The solid article is embedded in the raw material 6. The raw material container 5 is extracted from the printing device 1; the unused raw material is removed therefrom and may be refilled into the raw material supply container 14 for manufacturing another solid article. The solid article 10 is thus separated from the raw material 6, which may be re-used.

Figure 2:
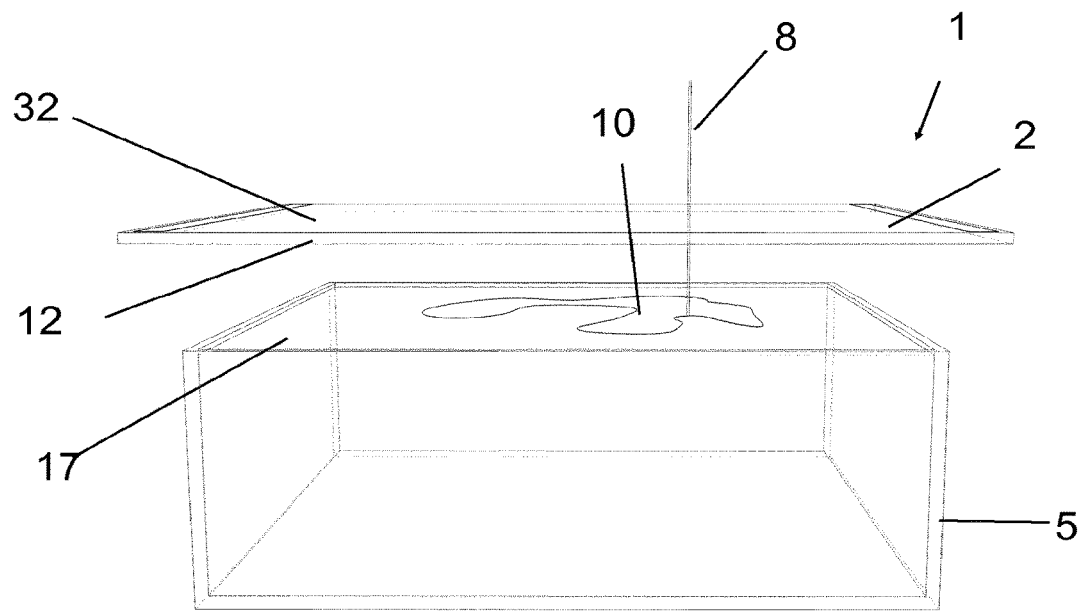
Figure 3:
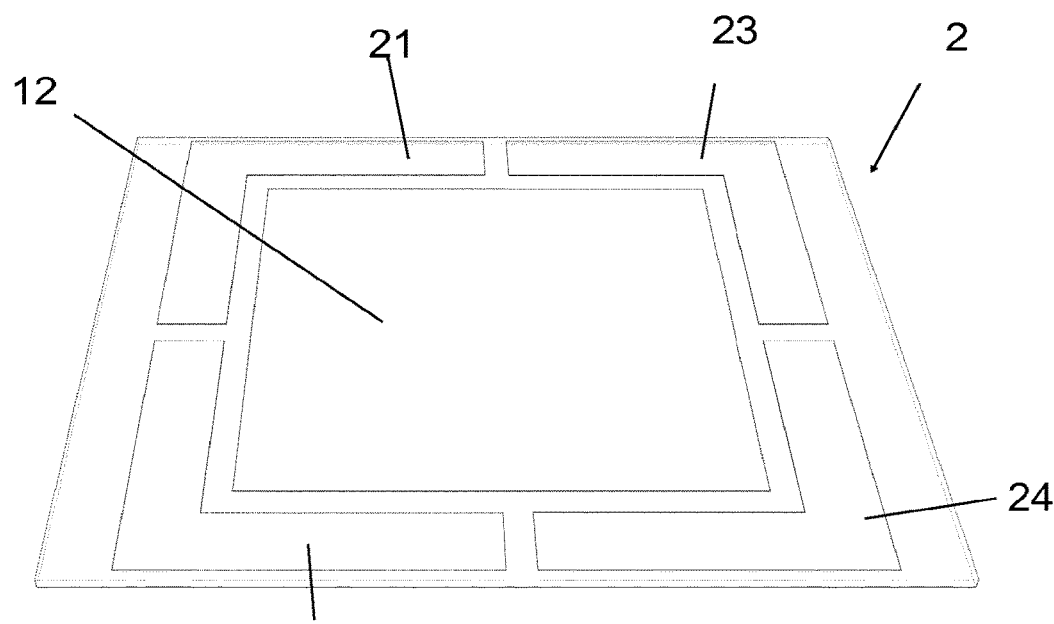
Figure 4:
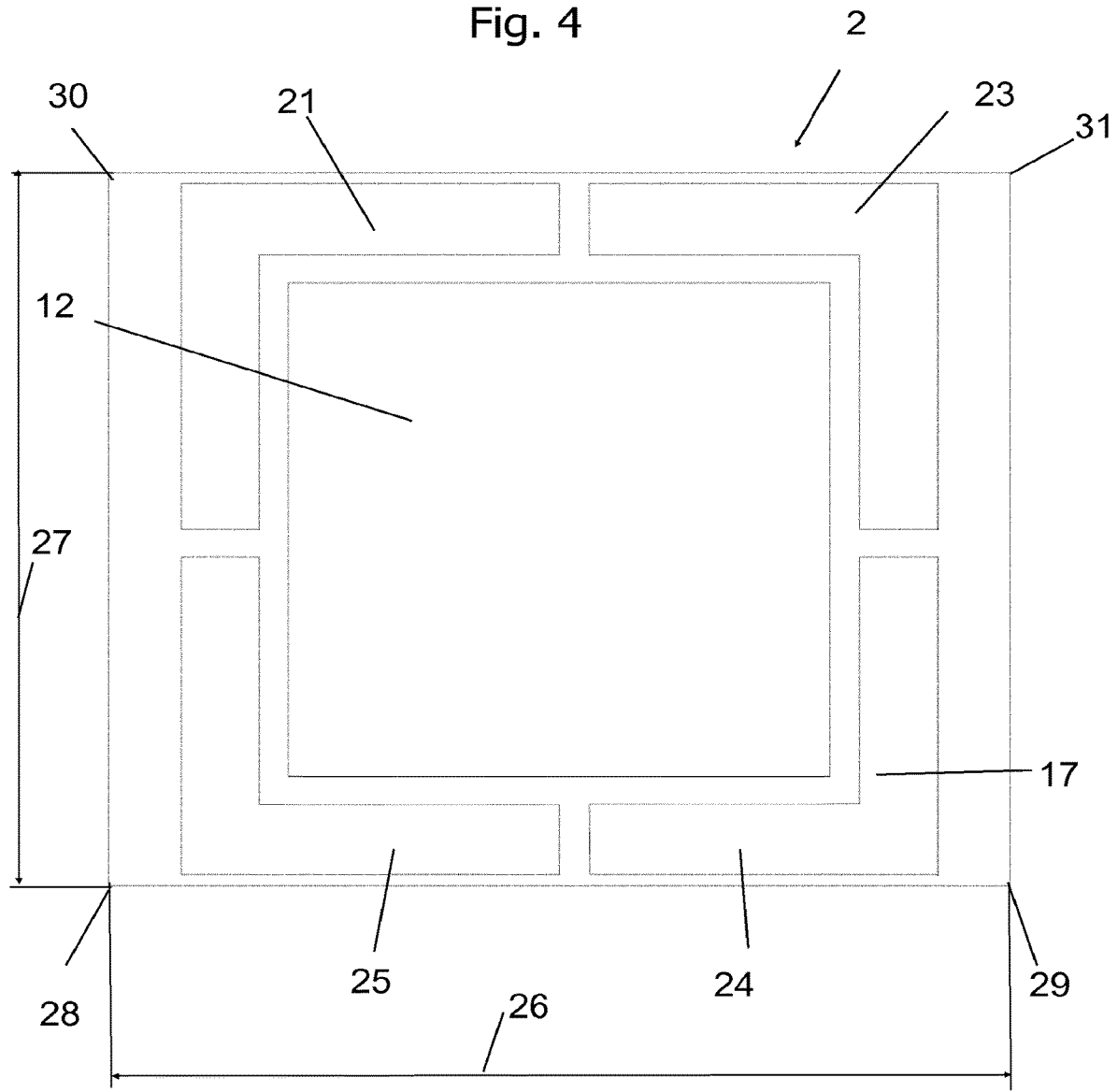

According to the embodiment shown in FIG. 2, FIG. 3 and FIG. 4, the heating device containing the heating surface 12 is configured as a plate element, which has a length 26 and a width 27 and a height. The height of the heating device 2 is smaller than the length 26 or the width 27, whereby the length 26 corresponds at least to the length of the raw material container and the width 27 corresponds at least to the width of the raw material container. The heating surface 12 can essentially correspond to the heating device as shown in FIG. 2.

According to the embodiment shown in FIG. 3 or FIG. 4, the heating device 2 can comprise a plurality of heating surfaces 12, 21, 23, 24, 25. The length 26 extends from the first edge 28 to the second edge 29. The width 27 extends from the first edge 28 to the third edge 30. The shape of the heating device 2 is substantially rectangular. The height of the heating device extends from the heating surface 12 to the upper surface 32, i.e. the surface opposite the heating surface 12. The heating surface 12 is transmissive for the laser beam, any of the heating surfaces 21, 22 (FIG. 1), 23, 24, 25 can also be transmissive for the laser beam but are not required to be transmissive. Each of the heating surfaces can have an independent temperature control. In particular, the temperature of each of the heating surfaces may vary based on temperature gradients present in the pre-heated raw material. In particular, the temperature of the heating surfaces 21, 23, 24, 25 may be higher than the temperature of the heating surface 12. Thereby the heat sink effect of the wall of the raw material container can be compensated for. By providing an independent temperature control for any of the heating surfaces, the temperature of the pre-heated raw material surface can be kept substantially constant. In particular, the variation of the temperature over the pre-heated raw material surface can be less than 2 degrees Celsius, more preferably less than 1 degree Celsius.

According to any of the preceding embodiments, the distance between the heating surface 12 and the pre-heated raw material surface 17 is less than 200 mm. By the term distance, it is to be understood the distance measured in a direction normal to the plane containing the heating surface 12. The raw material container 5 is movable by the drive unit 18 in a direction normal to the raw material surface 7, such that the distance between the heating surface 12 and the pre-heated raw material surface 17 can be kept constant. In particular, the heating surface 12 and the raw material surface 7 are parallel to each other. According to an embodiment not shown in the drawings, the heating device 2 can be movable with respect to the raw material surface. According to any of the preceding embodiments, the heating surface can comprise a nonstick coating. According to this variant, the heating surface can be in contact with the raw material on the surface. The raw material may be pre-heated by conduction; thereby the heating of any intermediate atmospheric layer between the raw material surface 7 and the heating surface 12 is avoided. Accordingly, the energy consumption of the heating device can be further reduced.

Figure 5:
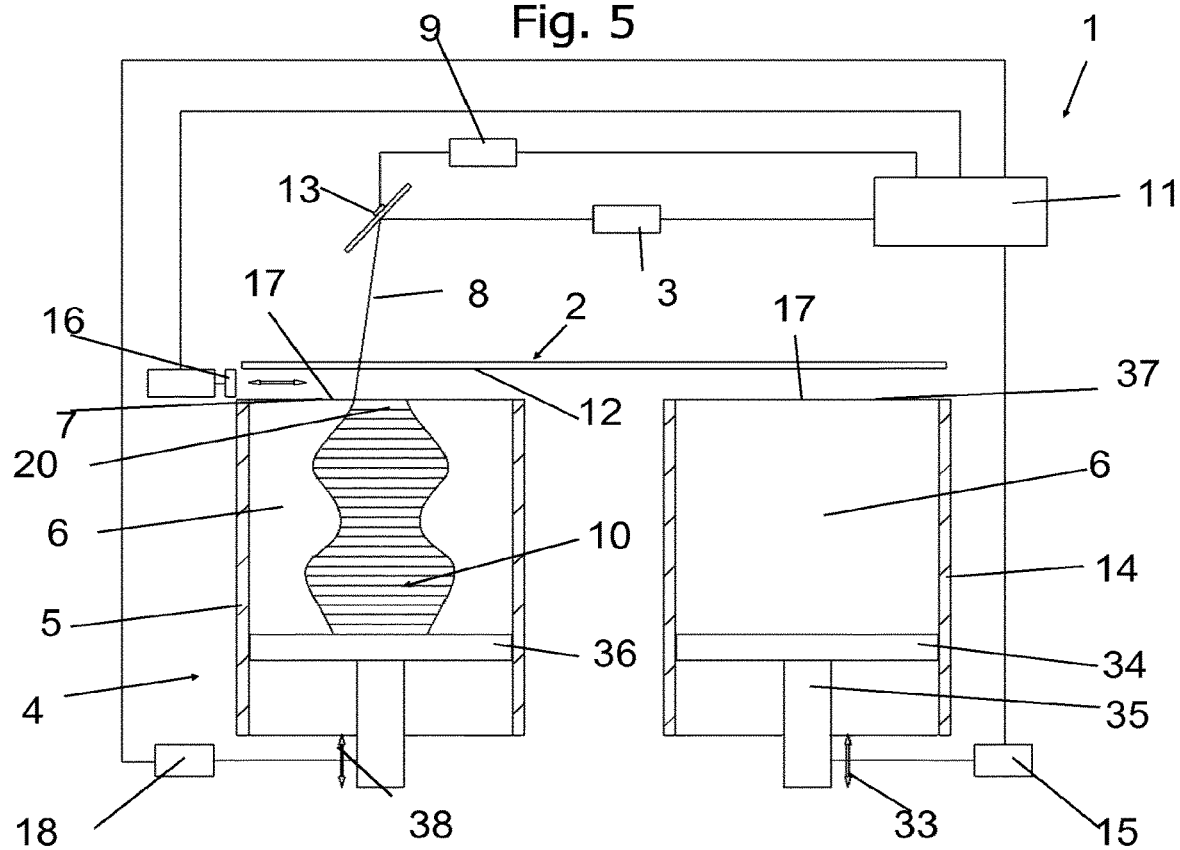

FIG. 5 shows a schematic view of an additive manufacturing device according to a fourth embodiment of the invention. The elements which have the same function as in any one of the preceding embodiments carry the same reference numbers. An additive manufacturing device 1 includes a heating device 2 for manufacturing a solid article 10 in an additive manufacturing sequence. The additive manufacturing device comprises a laser generation unit 3, in particular a diode laser generation unit, a raw material supply unit 4 and a raw material container 5 containing a raw material 6. The raw material 6 has a raw material surface 7 exposed to a laser beam 8 to be emitted by the laser generation unit 3 when it is operated. The operation of the laser is controlled by a control unit 9.

The heating device 2 includes a heating surface 12 to provide thermal energy to the raw material surface 7 to form a pre-heated raw material surface 17. The laser generation unit 3 is disposed with a directing unit 13 to direct the laser beam 8 onto the pre-heated raw material surface 17 according to a computer generated model of the solid article 10 stored in a storage unit 11 associated with the control unit 9. Thereby the operation of the directing unit 13 is controlled by the control unit 9. The laser beam 8 generated by the laser generation unit 3 passes through the heating surface 2 onto the pre-heated raw material surface 17. Thus, the laser beam 8 travels through the heating surface 12 of the heating device 2. In particular, the heating surface 12 is transparent for a laser beam of a diode laser. Advantageously the heating surface is transparent for light of a wavelength in a range of 100 nm up to and including 1 mm.

The generation of a solid article 10 by an additive manufacturing method performed by the additive manufacturing device involves the following steps. A raw material is supplied as a layer of a thickness of less than 1 mm by the raw material supply unit 4. According to a preferred embodiment, the thickness or height of the layer is about 150 μm. The raw material supply unit 4 can include a raw material supply container 14, which is filled with raw material 6. The raw material supply container 14 or the raw material 6 stored inside the raw material supply container is movable in a direction normal to the plane containing the layer of raw material for manufacture of the solid article by the additive manufacturing method. In particular, a piston-shaped lifting unit 34 can be provided in the raw material supply container. The piston shaped lifting unit 34 includes the bottom of the raw material supply container and a rod member 35 attached thereto. The direction of movement of the lifting unit 34 comprising the rod member 35 is shown by arrows 33. The raw material supply unit 4 includes a drive unit 15 for moving the bottom of the raw material supply container 14 in a stepwise manner by actuating the lifting unit 34. For the generation of each new layer, the bottom of the raw material supply container 14 is moved a step upwards such that a volume corresponding to the thickness of a new layer is supplied to the raw material chamber 20 connecting the raw material supply container 14 and the raw material container 5.

The raw material container and the raw material supply container open into a raw material chamber, which is omitted in FIG. 5. Once the bottom of the raw material supply container 14 is moved a step upward, the raw material for a second or subsequent layer is provided. The raw material is distributed on the surface of the first layer or preceding layer for which the additive manufacturing process has already been completed. A raw material distribution unit 16 is provided for distributing the raw material to form a new raw material surface 7. The raw material distribution unit 16 can be in particular be configured as a roller. The raw material distribution unit 16 can perform a sliding or rolling movement along the chamber bottom of the raw material chamber. The raw material distribution unit 16 thereby pushes the volume of raw material supplied for generation of the second or subsequent layer to the raw material container 5. The raw material container 5 or the raw material 6 and the portion of the solid article 10 embedded in the raw material is also movable in a direction normal to the chamber bottom 36 of the raw material chamber, which is normal to the plane of the raw material surface 7. In particular, a drive unit 18 can be foreseen for allowing the bottom 36 the raw material container 5 to move away from the bottom of the raw material chamber, which is in FIG. 5 shown as a downward movement, which is indicated by arrows 38.

The heating device 2 includes a heating surface 12 for heating the raw material surface 7 of the raw material 6 in the raw material container 5 as well as the raw material surface 37 of the raw material in the raw material supply container 14. The heating surface 12 extends towards the raw material surface 7 and the raw material surface 37 of the raw material 6. The raw material surface 7, 37 is pre-heated by the thermal energy generated by the heating surface 12 to from a pre-heated raw material surface 17. The heating device 2 according to this embodiment is of a rectangular cross-section corresponding to the cross-section of the raw material container 5 and the raw material supply container 14. The heating device 2 can comprise also in this embodiment an annular heating surface or a plurality of heating surface segments as shown e.g. in the embodiments according to FIGS. 2 to 4. The heating surface 12 is transparent to the laser beam, such that the laser beam passes through the heating surface 12. The annular heating surface or each of the heating surface segments can contain a radiation heater or a resistance heater. The laser beam 8 generated and emitted by the laser generation unit 3 is directed by a directing unit 13 onto the pre-heated raw material surface.

The laser can proceed at a speed of at least 50 mm/s. That means, the laser travels at a speed of at least 50 mm/s over the pre-heated raw material surface and sinters the pre-heated raw material surface 17 at the spots of contact.

The laser beam is directed over the pre-heated raw material surface 17 according to a computer generated model of the solid article 10 stored in a storage unit 11 associated with the control unit 9. The laser beam 8 travels through the heating surface 12 onto the pre-heated raw material surface 17 such that a first or preceding solid layer 20 of the solid article 10 is obtained when directing the laser beam 8 onto the pre-heated raw material surface 17. In at least one subsequent step, a second or subsequent layer of the raw material 6 is supplied from the raw material supply unit and deposited on top of the first layer. This subsequent step can be repeated until the solid article 10 is obtained by adding the solid layers 20 one upon each other. The raw material container 5 or at least the bottom 36 thereof is successively moved downwardly by the drive unit 18. After completion of the last solid layer, the additive manufacturing process of the solid article 10 is completed. The solid article 10 is embedded in the raw material 6. The raw material container 5 can be extracted from the additive manufacturing device 1 or the solid article 10 buried in the raw material 6 can be dug out. The unused raw material is removed therefrom and may be refilled into the raw material supply container 14 for manufacturing another solid article. The solid article 10 is thus separated from the raw material 6, which may be re-used and thus recycled.

Figure 6:
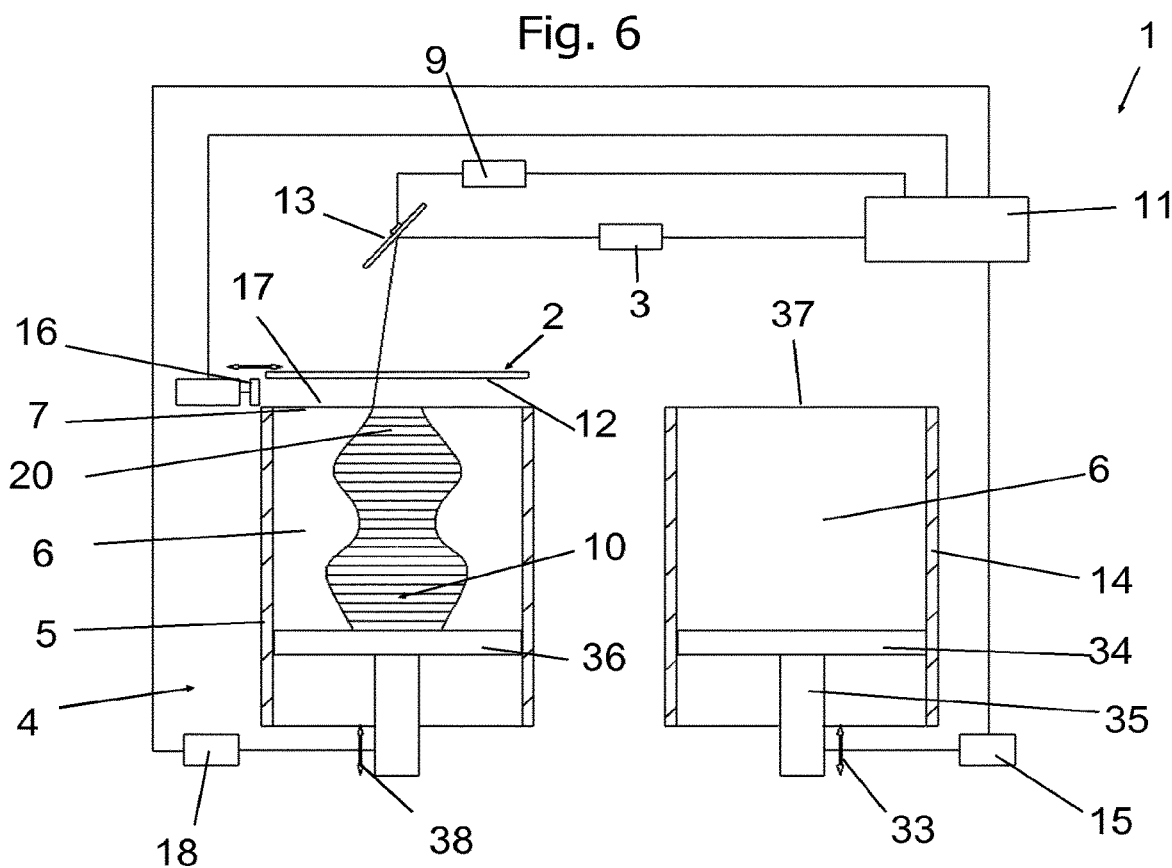

FIG. 6 is a schematic view of an additive manufacturing device according to a fifth embodiment of the invention, which differs from the embodiment of FIG. 5 in one respect. The heating device 2 according to this embodiment is of a rectangular cross-section corresponding to the cross-section of the raw material container 5. The raw material supply container 14 is according to this embodiment not covered by the heating device 2. Therefore, the raw material surface portion in the raw material supply container 14 is not pre-heated. The heating device 2 can comprise also in this embodiment an annular heating surface or a plurality of heating surface segments as shown e.g. in the embodiments according to FIGS. 2 to 4. The heating surface 12 is transmissive or transparent to the laser beam, such that the laser beam passes through the heating surface 12. The annular heating surface or each of the heating surface segments can contain a radiation heater or a resistance heater. The laser beam 8 generated and emitted by the laser generation unit 3 is directed by a directing unit 13 onto the pre-heated raw material surface 17. The remaining configuration of this embodiment is the same as in the embodiment of FIG. 5, therefore it is referred to this embodiment and the description of the embodiment according to FIG. 5 applies explicitly also to the embodiment according to FIG. 6 and is thereby incorporated by reference.

FIG. 7 is a schematic view of an additive manufacturing device according to a sixth embodiment of the invention, which differs from the embodiment of FIG. 5 in one respect. The heating device 2 according to this embodiment is of a rectangular cross-section corresponding to the cross-section of the raw material container 5. The raw material supply container 14 is according to this embodiment covered by a further heating device 42, which is according to this embodiment separate from the heating device 2. The heating device 2 can comprise also in this embodiment an annular heating surface or a plurality of heating surface segments as shown e.g. in the embodiments according to FIGS. 2 to 4. The heating surface 12 is transparent to the laser beam, such that the laser beam passes through the heating surface 12. The annular heating surface or the heating surface segments as well as the heating surface 52 of heating device 42 can contain a radiation heater or a resistance heater. The laser beam 8 generated and emitted by the laser generation unit 3 is directed by a directing unit 13 onto the pre-heated raw material surface 17. The remaining configuration of this embodiment is the same as in the embodiment of FIG. 5, therefore it is referred to this embodiment and the description of the embodiment according to FIG. 5 applies explicitly also to the embodiment according to FIG. 7 and is thereby incorporated by reference. The heating surface 52 needs not to be transparent for the passage of a laser beam unless the additive manufacturing device is configured such that the material supply container may be used also as a raw material container for manufacturing a solid article, thus the operation of a container as the raw material container and the raw material supply container is switched after completion of a production cycle. Thus for the production of a first solid article in the raw material container 5, the bottom 36 thereof is successively lowered until the solid article 10 is completed. The solid article 10 is taken out from the raw material container and new raw material can be added to the remaining raw material in the raw material container. The raw material container then assumes the function of a raw material supply container while at the same time the additive manufacturing process of a second solid article is initiated in the raw material container 14. The bottom 34 of the container 14 is now in the uppermost position and is lowered by the drive unit 15. This embodiment has the additional advantage that the power requirements for the lifting and lowering operations can be minimized as each of the containers is already in a position to initiate either an additive manufacturing operation or a supply operation.

FIG. 8 is a schematic view of an additive manufacturing device according to a seventh embodiment of the invention, which differs from the embodiment of FIG. 5 in one respect. The heating device 2 according to this embodiment is of a rectangular cross-section corresponding to the cross-section of the raw material container 5. The raw material supply container 14 is according to this embodiment not covered by the heating device 2. Therefore, the raw material surface portion in the raw material supply container 14 is not pre-heated. The heating device 2 is movable towards and away from the raw material surface 7. The direction of the movement is indicated by the arrows 39. The heating device 2 can comprise also in this embodiment an annular heating surface or a plurality of heating surface segments as shown e.g. in the embodiments according to FIGS. 2 to 4. The heating surface 12 is transmissive or transparent to the laser beam, such that the laser beam passes through the heating surface 12. The annular heating surface or each of the heating surface segments can contain a radiation heater or a resistance heater. The laser beam 8 generated and emitted by the laser generation unit 3 is directed by a directing unit 13 onto the pre-heated raw material surface 17 when operating. The laser beam 8 is not shown in this embodiment as it shows the moment in which a new layer of raw material is applied onto a previous layer for which the additive manufacturing process has been completed. Therefore, the laser beam is switched off. The heating device 2 has been moved in a rest position to allow the passage of the raw material distribution unit 16 over the raw material surface to distribute a new layer of raw material thereon. After completion of the application of a new layer, the heating device 2 is lowered, thus the distance between the raw material surface 7 and the heating surface is reduced. Thereby the new layer is pre-heated to become a pre-heated raw material surface. The laser generation unit 3 is turned on, such that the laser beam can start with the sintering operation to shape a new layer of the solid article 10. The remaining configuration of this embodiment is the same as in the embodiment of FIG. 5, therefore it is referred to this embodiment. The description of the embodiment according to FIG. 5 applies explicitly also to the embodiment according to FIG. 8 and is thereby incorporated by reference.

Figure 9A:
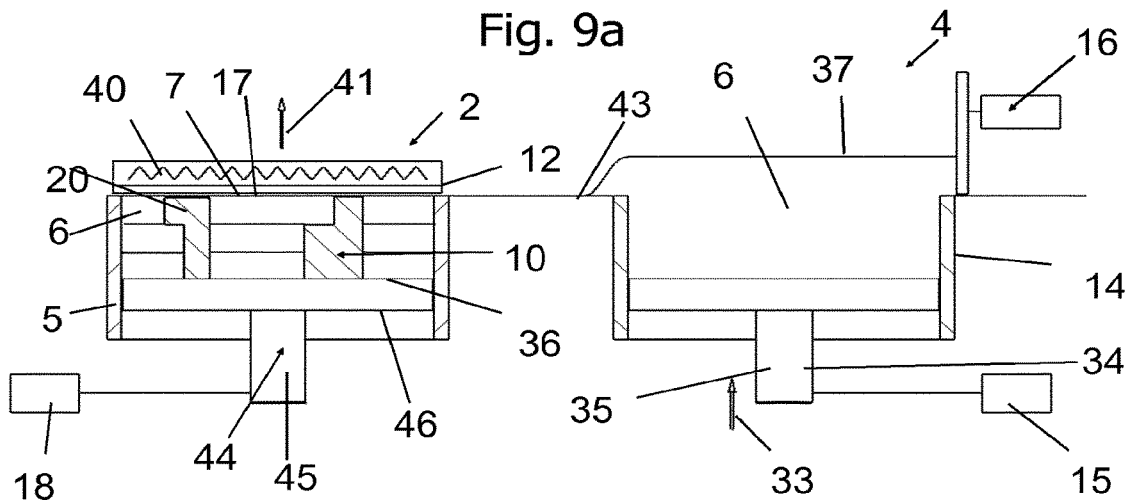

FIG. 9a shows a schematic view of an additive manufacturing device 100 according to an eighth embodiment of the invention. This view represents a first step in the method of manufacture of a solid layer of a solid article 20 by the additive manufacturing device 100. The elements, which have the same function as in any one of the preceding embodiments, carry the same reference numbers. The additive manufacturing device 100 includes a heating device 2 for manufacturing a solid article 10 in an additive manufacturing sequence. The additive manufacturing device comprises a laser generation unit 3 (which is omitted in FIG. 9a), in particular a diode laser generation unit, a raw material supply unit 4 and a raw material container 5 containing a raw material 6. The raw material 6 has a raw material surface 7, which can be exposed to a laser beam to be emitted by the laser generation unit when it is operated. The operation of the laser is controlled by a control unit, which is also not shown in FIG. 9a.

The heating device 2 includes a heating surface 12 to provide thermal energy to the raw material surface 7 to form a pre-heated raw material surface 17 when switched on. The heating surface 12 according to this embodiment is heated by a heating element 40. FIG. 9a shows the moment in time in which a solid layer 20 has just been completed by an operational sequence of the additive manufacturing device. The heating element may be switched off during this moment. According to the current embodiment, the heating element 40 transmits thermal energy to the heating surface 12 when switched on. Thus, the heating surface 12 may be passively heated by the heating element 40.

The generation of a solid article 10 by an additive manufacturing method performed by the additive manufacturing device 100 involves thus in a first stage moving the heating device 2 away from the pre-heated raw material surface 17 after completion of the solid layer 20 of the solid article 10. The movement of the heating device is indicated by an arrow 41. The additive manufacturing device 100 is prepared in this stage for the application of a further layer, which is applied onto the raw material containing the solid layer 20.

The heating surface 12 has been in contact with the pre-heated raw material surface 17 during the generation of the solid layer 20. Thereby the heat transfer from the heating surface 12 to the pre-heated raw material surface 17 is performed predominantly by conduction with almost no convective heat transfer. Thereby the heat loss is minimized and the energy efficiency increased.

For the generation of a subsequent layer, new raw material has to be supplied onto the pre-heated raw material surface 17. Therefore, a raw material supply unit 4 is provided. The raw material supply unit 4 can include a raw material supply container 14, which is filled with raw material 6. Concurrently to the lifting movement of the heating device 2, new raw material can be supplied from the raw material supply container 14. The raw material container 14 contains the raw material 6 having a raw material surface 37. The raw material supply container 14 or the raw material 6 stored inside the raw material supply container is movable in a direction normal to the plane containing the layer of raw material for manufacture of the solid article by the additive manufacturing method. In particular, a piston-shaped lifting unit 34 can be provided in the raw material supply container 14. The piston shaped lifting unit 34 includes the bottom of the raw material supply container and a rod member 35 attached thereto. The direction of movement of the lifting unit 34 comprising the rod member 35 is shown by arrow 33. The raw material supply unit 4 includes a drive unit 15 for moving the bottom of the raw material supply container 14 in a stepwise manner by actuating the lifting unit 34. For the generation of each new layer, the bottom of the raw material supply container 14 is moved a step upwards such that a volume corresponding to the thickness of a new layer is supplied to the raw material chamber 20 connecting the raw material supply container 14 and the raw material container 5.

The raw material container and the raw material supply container open into a raw material chamber having a bottom surface 43. Once the bottom of the raw material supply container 14 is moved a step upward, the raw material for a second or subsequent layer is provided. According to FIG. 9a, the raw material is spilled onto the bottom surface 43. This raw material is to be distributed on the surface of the first layer or preceding layer for which the additive manufacturing process has already been completed. A raw material distribution unit 16 is provided for distributing the raw material to form a new raw material surface 7. The raw material distribution unit 16 can be configured as a pushing element. However, this graphic representation is by no way limiting the disclosure to pushing elements. A pushing element can be chosen in particular from the group of rollers, doctor blades. Alternatively or in addition thereto, any other suitable device for transferring the raw material onto the top of the pre-heated raw material surface 17 can be provided. The raw material distribution unit 16 can perform a sliding or rolling movement along the bottom surface 43 of the raw material chamber as shown in FIG. 9c.

Figure 9B:
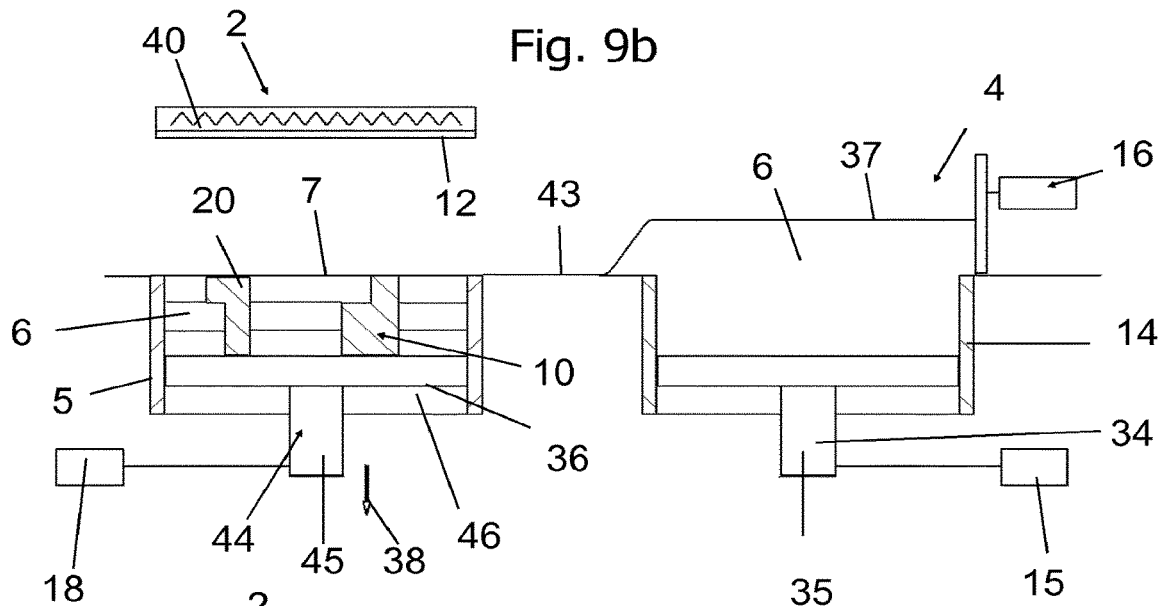

FIG. 9b shows a schematic view of an additive manufacturing device according to the eighth embodiment showing a second step in which the heating device is removed from the pre-heated raw material surface. The raw material surface may cool down in particular if the heating device is switched off as shown in FIG. 9b.

A layer of a thickness of less than 1 mm is to be applied on top of the raw material surface 7 by the raw material supply unit 4. According to a preferred embodiment, the thickness or height of the layer is about 200 μm. The result of the movement of the lifting unit 34 is shown in FIG. 9b. A portion of the raw material 6 stored in the raw material supply container 14 has been provided. Before the raw material distribution unit 16 can supply the raw material to the raw material container 5, a volume corresponding to the volume of the new layer has to be provided in the raw material container 5. This volume is provided by lowering the bottom 36 of the raw material container 5, as indicated by arrow 38 by a level adjustment unit 44. According to this configuration a drive unit 18 is provided, which acts on a rod member 45 attached to a piston body 46 forming the bottom 36 of raw material container 5.

Figure 9C:
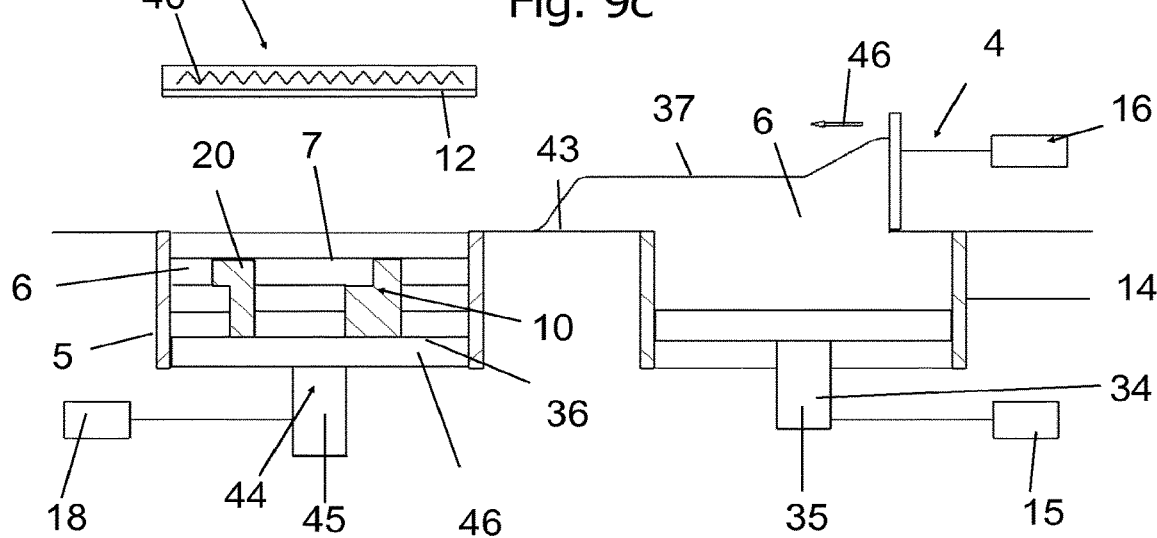

FIG. 9c shows a schematic view of an additive manufacturing device according to the eighth embodiment showing a third step of the method. The raw material distribution unit 16 pushes the volume of raw material supplied for generation of the second or subsequent layer to the raw material container 5. The raw material container 5 or the raw material 6 and the portion of the solid article 10 embedded in the raw material has been moved by the level adjustment unit 44 in a direction normal to the chamber bottom 36 of the raw material chamber, which is normal to the plane of the raw material surface 7. In particular, the drive unit 18 has moved the bottom 36 the raw material container 5 away from the bottom of the raw material chamber, which is in FIG. 9c shown as the result of the downward movement performed during the stage depicted in FIG. 9b. The raw material supplied from the raw material container 14 is moved by the raw material distribution unit 16 in the direction of the raw material container 5. The direction of this movement is indicated by arrow 46.

Figure 9D:
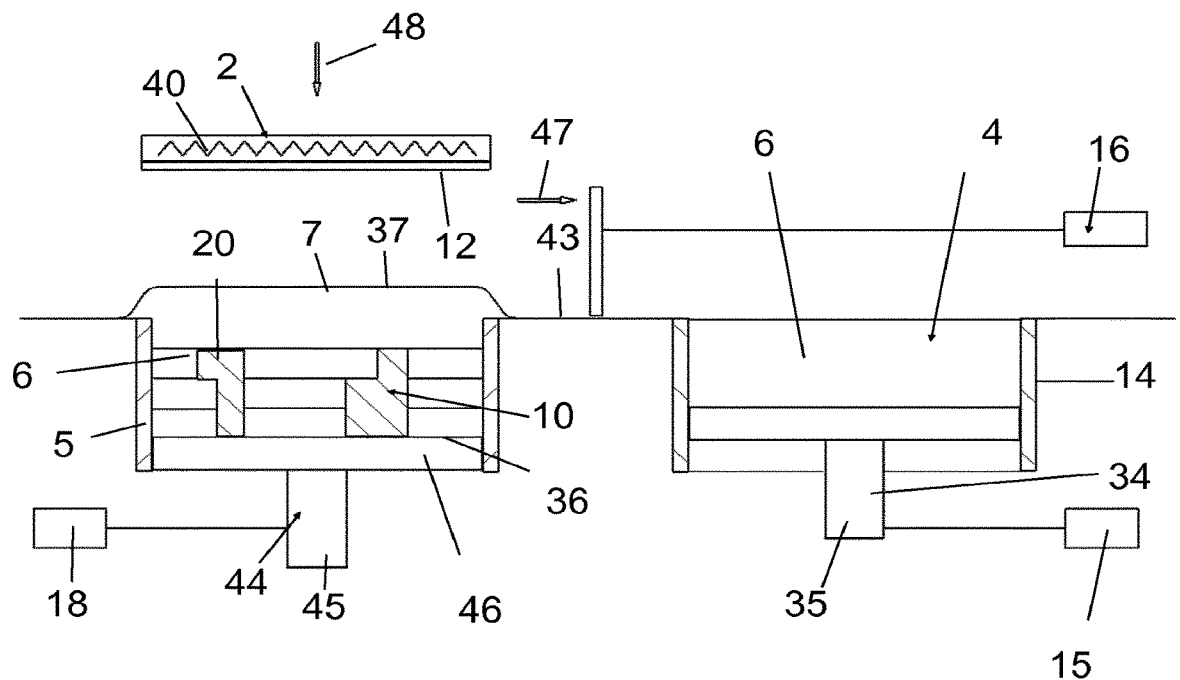

FIG. 9d is a schematic view of an additive manufacturing device according to the eighth embodiment showing a fourth step of the method. During this step, the pushing element is moved away from the raw material container 5 again as indicated by arrow 47. The heating device 2 is moved towards the raw material surface 7, which now corresponds to the new raw material surface 37 generated by the supply of new raw material from raw material container 14 as described in connection with the previous steps.

Figure 9E:
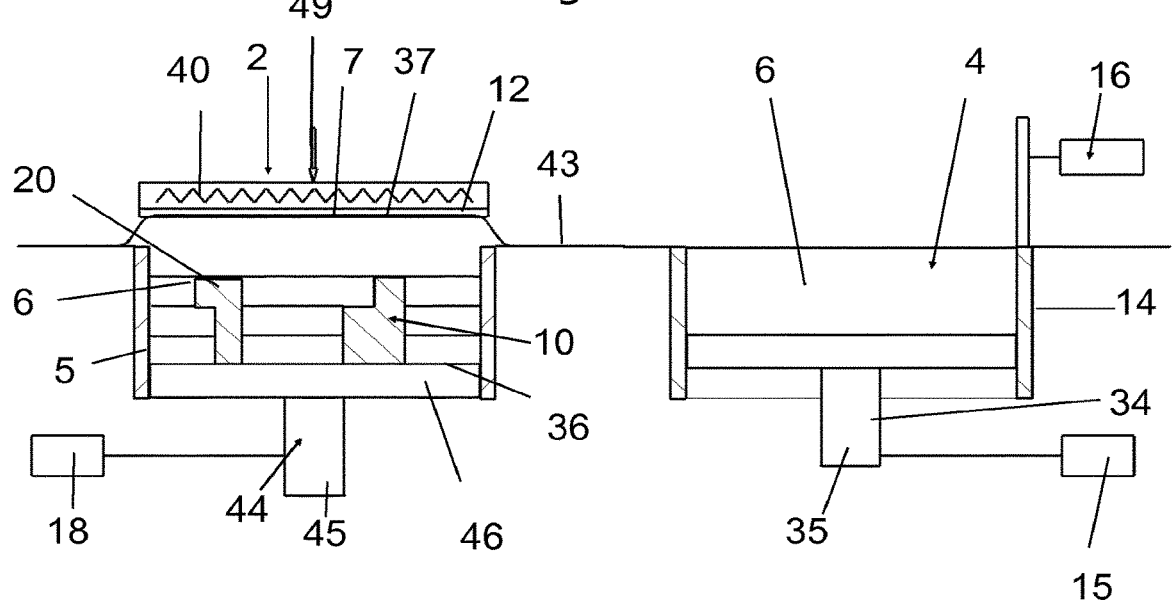

FIG. 9e is a schematic view of an additive manufacturing device according to the eighth embodiment showing a fifth step of the method, in which the pushing element of the raw material distribution unit 16 is moved into the initial position as shown in FIG. 9a or FIG. 9b. Furthermore, it is shown in FIG. 9e that the heating surface 12 of the heating device 2 is positioned on top of the raw material surface 7, 37. At this stage the heating element 40 can already be switched on, but it is not required that it is switched on already. In FIG. 9e, it is shown that the thickness of the uppermost raw material layer containing the raw material surface 7, 37 is greater than the thickness of the layers thereunder for which the additive manufacturing method has already been completed. Prior to a new cycle for generating a further solid layer of the solid article 20, the raw material is compacted. The compaction or compression of the raw material is obtained by moving the heating device 2 into the direction of raw material 6 containing the already finished portion of the solid article 10. This movement is shown as a downward movement by arrow 49. By compressing the raw material, the raw material density can be increased. In particular, if the raw material is a powder, the density of the powder is increased as the volume of voids between the particles is reduced. Therefore, the porosity of such a powder is reduced.

Figure 9F:
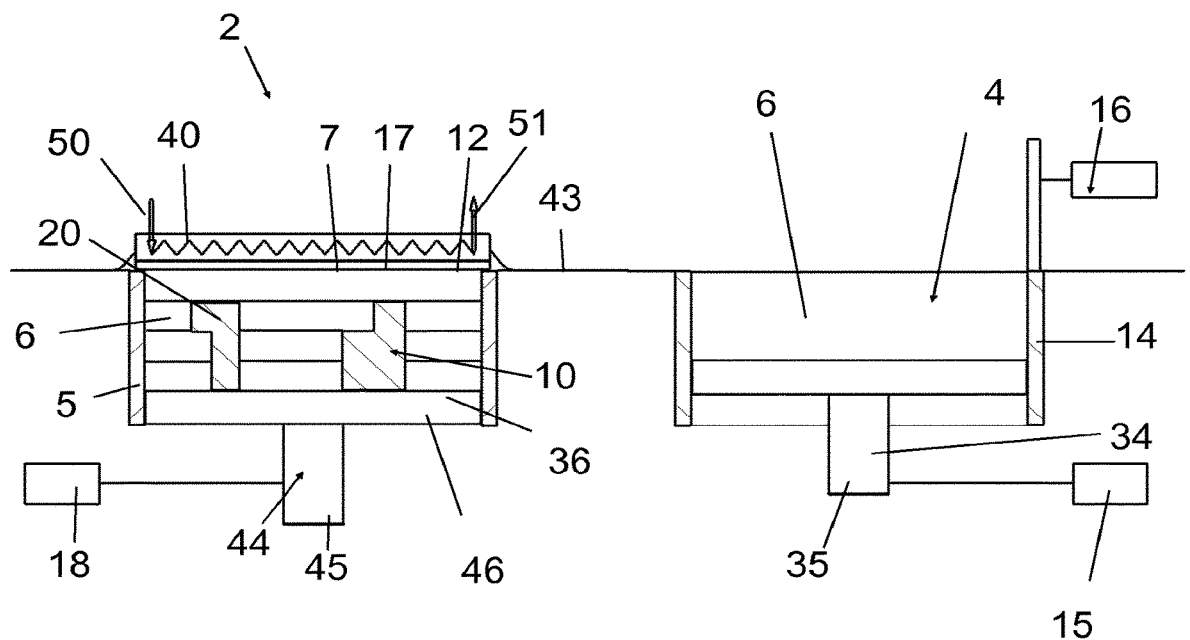

FIG. 9f is a schematic view of an additive manufacturing device according to the eighth embodiment showing a sixth step of the method, in which the compaction or compression of the raw material in the raw material container 6 has been completed. The heating device 2 can be switched on to generate a pre-heated raw material surface 17. The heating element 40 of the heating device 2 is fed with thermal energy from a medium, as shown schematically by arrow 50. Arrow 51 schematically shows a discharge of the medium. The medium can include any of a current flow, a flow involving a magnetic or electric field or a fluid flow. The heating device 2 includes a heating surface 12 for heating the raw material surface 7 of the raw material 6 in the raw material container 5. The heating surface 12 extends towards the raw material surface 7 and the raw material surface 37 of the raw material 6. The heating surface can be a portion of the heating element or can be a separate thin-walled element attached to the heating element. In particular, the heating surface may receive thermal energy from the heating element, such that the heating surface is passively heated.

The raw material surface 7, 37 is pre-heated by the thermal energy generated by the heating surface 12 to from a pre-heated raw material surface 17. The heating device 2 according to this embodiment can be of a rectangular or circular cross-section corresponding to the cross-section of the raw material container 5 and the raw material supply container 14. The heating device 2 can comprise also in this embodiment an annular heating surface or a plurality of heating surface segments as shown e.g. in the embodiments according to FIGS. 2 to 4 or any of the embodiments according to FIG. 5 to FIG. 8.

Figure 9G:
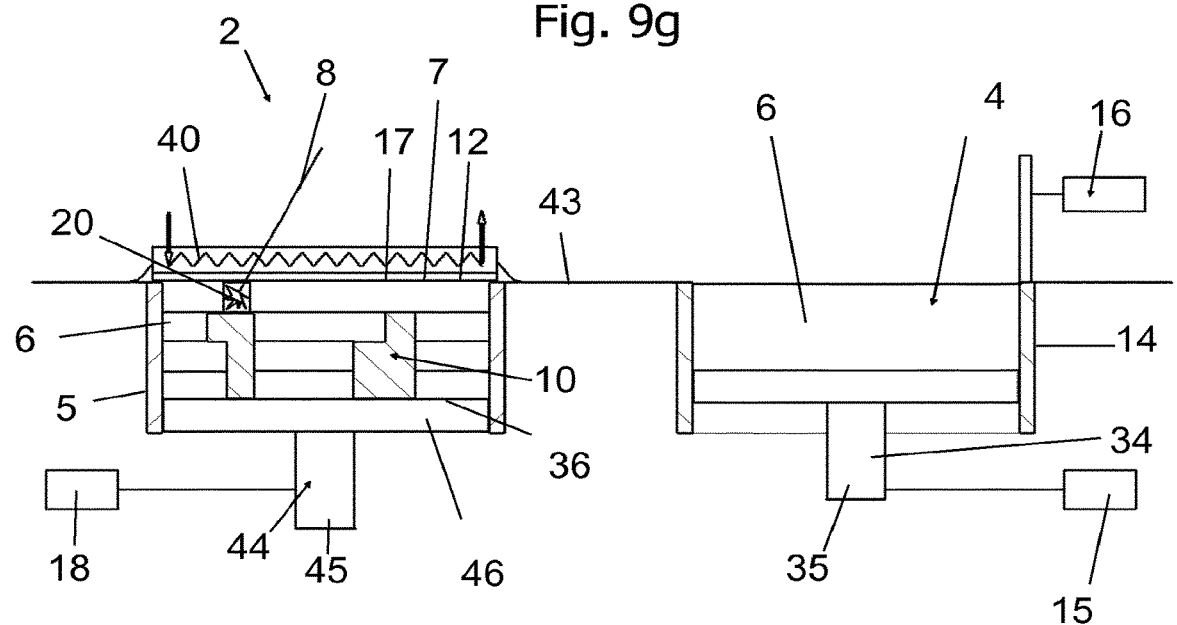

FIG. 9g is a schematic view of an additive manufacturing device according to the eighth embodiment showing a seventh step of the method in which the generation a new solid layer 20 of the solid article is performed. A laser beam 8 is directed through the heating device onto the pre-heated raw material surface. The pre-heated raw material surface thereby comprises advantageously a pre-heating of the entire layer of raw material. By pre-heating the raw material surface, the thermal stress introduced by the energy supplied by the laser beam is reduced, thereby warping effects can be reduced if not entirely avoided.

According to an embodiment, the heating surface 12 and the heating element 40 are transparent to the laser beam, such that the laser beam passes through the heating surface 12 and the heating element 40. The heating surface or each of the heating surface segments can be heated by a heating element from the group of a radiation heater, an induction heater or a resistance heater. According to an embodiment, the heating element can be arranged outside of the travel path of the laser beam. The heating surface 12 is heated by the heating element. According to this embodiment, a transparency of the heating element for the laser beam is not required.

The laser beam 8 generated and emitted by the laser generation unit 3 is directed by a directing unit 13 (see FIGS. 1, 5-8) onto the pre-heated raw material surface. The laser can proceed at a speed of at least 50 mm/s. That means, the laser travels at a speed of at least 50 mm/s over the pre-heated raw material surface and sinters the pre-heated raw material surface 17 at the spots of contact. The laser beam 8 generated by the laser generation unit 3 passes through the heating surface 2 onto the pre-heated raw material surface 17. Thus, the laser beam 8 travels through the heating surface 12 and optionally through the heating element 40 of the heating device 2. In particular, the heating surface 12 is transparent for a laser beam of a diode laser. Advantageously the heating surface is transparent for light of a wavelength in a range of 100 nm up to and including 1 mm.

The laser beam is directed over the pre-heated raw material surface 17 according to a computer generated model of the solid article 10 stored in a storage unit 11 associated with the control unit 9. The laser beam 8 travels through the heating surface 12 onto the pre-heated raw material surface 17 such that a first or preceding solid layer 20 of the solid article 10 is obtained when directing the laser beam 8 onto the pre-heated raw material surface 17. In at least one subsequent step, a second or subsequent layer of the raw material 6 is supplied from the raw material supply unit and deposited on top of the first layer. This subsequent step can be repeated until the solid article 10 is obtained by adding the solid layers 20 one upon each other. The raw material container 5 or at least the bottom 36 thereof is successively moved downwardly by the drive unit 18. After completion of the last solid layer, the additive manufacturing process of the solid article 10 is completed. The solid article 10 is embedded in the raw material 6. The raw material container 5 can be extracted from the additive manufacturing device 1 or the solid article 10 buried in the raw material 6 can be dug out. The unused raw material is removed therefrom and may be refilled into the raw material supply container 14 for manufacturing another solid article. The solid article 10 is thus separated from the raw material 6, which may be re-used and thus recycled.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of an element or compound selected from the group consisting of A, B, C . . . and N, the text should be interpreted as requiring only one element from the group, not A plus N, or B plus N, etc.

The invention claimed is:

1. An additive manufacturing device for manufacturing a solid article, comprising a laser generation unit and a build unit, wherein the laser generation unit is configured to emit a laser beam, wherein the build unit comprises a supply unit and a raw material container, wherein the raw material container contains a raw material, wherein the raw material is disposed with a raw material surface exposed to the laser beam emitted by the laser generation unit, wherein a heating device is arranged between the laser generation unit and the build unit, wherein the heating device is configured as a heating surface for heating the raw material surface to form a pre-heated raw material surface, wherein the laser generation unit is disposed with a directing unit configured to direct the laser beam onto the pre-heated raw material surface through the heating surface.

2. The additive manufacturing device of claim 1, wherein the heating surface is transparent or transmissive for the laser beam such that the laser beam can traverse the heating surface.

3. The additive manufacturing device of claim 1, wherein the heating surface is configured as a separation element which is arranged between the laser generation unit and the build unit.

4. The additive manufacturing device of claim 1, wherein the heating surface is configured as a heating element which is transparent or transmissive for the laser beam.

5. The additive manufacturing device of claim 4, wherein the heating surface is heatable by the heating element.

6. The additive manufacturing device of claim 1, wherein the laser generation unit comprises a control unit and a storage unit wherein the control unit is configured to control the laser generation unit for generating and directing the laser beam onto the pre-heated raw material surface according to a computer generated model of the solid article stored in the storage unit associated with the control unit.

7. The additive manufacturing device of claim 1, wherein the heating surface is substantially of a same size as the raw material surface.

8. The additive manufacturing device of claim 1, wherein the heating surface is transparent or transmissive for light of a wavelength range of 100 nm up to and including 1 mm.

9. The additive manufacturing device of claim 1, wherein a distance between the heating surface and the pre-heated raw material surface is less than 200 mm.

10. The additive manufacturing device of claim 1, wherein the heating device or the raw material container is movable to allow a raw material distribution unit to pass between the heating surface and the pre-heated raw material surface in any direction.

11. The additive manufacturing device of claim 1, wherein the heating surface comprises a nonstick coating.

12. The additive manufacturing device of claim 1, wherein the heating surface contains at least one of the elements of the group of a transparent conductive oxide, of a network of nanowires, of nanotubes or a glass material.

13. The additive manufacturing device of claim 1, wherein the raw material comprises a powder.

14. The additive manufacturing device of claim 13, whereby the powder contains a polymer, which undergoes a sintering process upon exposure to the laser beam, whereby the powder can contain at least one compound of the group of a polycarbonate (PC), a polymethylmethacrylate (PMMA), a polystyrene (PS), a high density polyethylene (PE-HD), a polyamide (PA) or a polyaryletherketone (PEEK).

15. A method for operating an additive manufacturing device for manufacturing a solid article by an additive manufacturing method, comprising a laser generation unit and a build unit, wherein the build unit comprises a raw material supply unit, a raw material container containing a raw material, wherein the raw material comprises a raw material surface forming a first layer which can be exposed to a laser beam emitted by the laser generation unit, wherein a heating device for heating the raw material surface is arranged between the laser generation unit and the build unit, wherein the heating device includes a heating surface for heating the surface of the raw material in the raw material container, wherein the raw material is pre-heated by the thermal energy generated by the heating surface to from a pre-heated raw material surface, wherein a laser beam is generated by the laser generation unit, wherein a directing unit directs the laser beam emitted by the laser generation unit onto the pre-heated raw material surface, wherein the laser beam passes through the heating surface to solidify the pre-heated raw material surface to obtain a first solid layer portion of the solid article, wherein at least one additional layer of the raw material is supplied from the raw material supply unit and deposited on top of the first layer, wherein the at least one additional layer is pre-heated by the thermal energy generated by the heating surface to from an additional pre-heated raw material surface, wherein the laser beam passes through the heating surface to solidify the at least one additional pre-heated raw material surface to obtain an additional solid layer portion of the solid article such that the solid article is obtained from a plurality of solid layer portions.

16. The method of operating an additive manufacturing device of claim 15, wherein by directing the laser beam onto the pre-heated raw material surface the raw material is sintered or solidified at least in a region covered by a spot of the pre-heated raw material surface exposed to the laser beam.

17. The method for operating an additive manufacturing device of claim 15 wherein the laser beam proceeds at a speed of more than 100 mm/s over the pre-heated raw material surface.

18. The method of operating an additive manufacturing device of claim 16 wherein a temperature at the spot is at least 0.5° C. above the temperature of the pre-heated raw material surface.

19. The method of operating an additive manufacturing device of claim 15, wherein the laser generation unit comprises a control unit and a storage unit wherein the control unit controls the laser generation unit to generate and direct the laser beam onto the pre-heated raw material surface according to a computer generated model of the solid article stored in the storage unit associated with the control unit.

20. The method of operating an additive manufacturing device of claim 15, wherein the heating surface is transparent or transmissive for the laser beam such that the laser beam traverses the heating surface before reaching the pre-heated raw material surface.

* * * * *